US012355078B2

(12) United States Patent
Yun et al.

(10) Patent No.: US 12,355,078 B2
(45) Date of Patent: Jul. 8, 2025

(54) RECHARGEABLE LITHIUM BATTERY

(71) Applicant: Samsung SDI Co., Ltd., Yongin-si (KR)

(72) Inventors: Pilsang Yun, Yongin-si (KR); Do-Yu Kim, Yongin-si (KR); Hyunbeom Kim, Yongin-si (KR); Sangin Park, Yongin-si (KR); Yongchan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 194 days.

(21) Appl. No.: 18/060,684

(22) Filed: Dec. 1, 2022

(65) Prior Publication Data

US 2023/0178725 A1 Jun. 8, 2023

(51) Int. Cl.
*H01M 4/525* (2010.01)
*H01M 4/485* (2010.01)
*H01M 4/505* (2010.01)
*H01M 4/62* (2006.01)
*H01M 10/0569* (2010.01)
(Continued)

(52) U.S. Cl.
CPC ........... *H01M 4/525* (2013.01); *H01M 4/485* (2013.01); *H01M 4/505* (2013.01); *H01M 4/62* (2013.01); *H01M 10/0569* (2013.01); *H01M 10/445* (2013.01); *H01M 10/448* (2013.01); *H01M 50/46* (2021.01); *H01M 50/578* (2021.01); *H01M 2004/028* (2013.01); *H01M 2300/0051* (2013.01)

(58) Field of Classification Search
CPC ..... H01M 4/525; H01M 50/578; H01M 50/46
See application file for complete search history.

(56) References Cited

U.S. PATENT DOCUMENTS 10,297,814 B2    5/2019   Tsubouchi et al.
2014/0045013 A1* 2/2014   Minami ................ B60L 3/0046
                                                         429/94
(Continued)

FOREIGN PATENT DOCUMENTS

EP    3272710 A1    1/2018
EP    3425703 B1    9/2019
(Continued)

OTHER PUBLICATIONS

Du et al. (ACS Appl. Mater. Interfaces 2020, 12, 56963-56973).*
(Continued)

*Primary Examiner* — Nicholas A Smith
(74) *Attorney, Agent, or Firm* — Womble Bond Dickinson (US) LLP

(57) ABSTRACT

A rechargeable lithium battery includes a positive electrode including a positive electrode active material including a secondary particle in which a plurality of primary particles are aggregated, the secondary particle having at least a portion of the primary particles radially arranged and comprising a lithium nickel-based composite oxide, and a boron coating layer on the surface of the secondary particle and including lithium borate; a negative electrode; a separator between the positive electrode and the negative electrode; an electrolyte including vinylene carbonate; and a case containing the positive electrode, the negative electrode, the separator, and the electrolyte.

18 Claims, 13 Drawing Sheets

(51) Int. Cl.
  *H01M 10/44*   (2006.01)
  *H01M 50/46*   (2021.01)
  *H01M 50/578*  (2021.01)
  *H01M 4/02*    (2006.01)

(56) References Cited

U.S. PATENT DOCUMENTS

| | | | |
|---|---|---|---|
| 2018/0026268 A1 | 1/2018 | Kim et al. | |
| 2018/0159109 A1* | 6/2018 | Tsubouchi | H01M 10/0525 |
| 2018/0212237 A1 | 7/2018 | Lee et al. | |
| 2019/0260017 A1* | 8/2019 | Yoo | H01M 10/0525 |
| 2020/0058919 A1* | 2/2020 | Kim | H01M 50/176 |
| 2020/0083524 A1 | 3/2020 | Baek et al. | |
| 2021/0074998 A1 | 3/2021 | Yun et al. | |
| 2021/0135212 A1 | 5/2021 | Choi et al. | |
| 2022/0199982 A1 | 6/2022 | Kuroda et al. | |
| 2022/0271283 A1 | 8/2022 | Sun et al. | |
| 2023/0074377 A1 | 3/2023 | Jung et al. | |
| 2023/0123331 A1* | 4/2023 | Watanabe | H01M 10/052 429/223 |

FOREIGN PATENT DOCUMENTS

| | | | | |
|---|---|---|---|---|
| EP | 4 020 630 A1 | 6/2022 | | |
| JP | 2000-149923 A | 5/2000 | | |
| JP | 2020-172418 A | 10/2020 | | |
| KR | 10-2003-0057321 A | 7/2003 | | |
| KR | 10-2018-0010122 A | 1/2018 | | |
| KR | 10-2019-0051863 A | 5/2019 | | |
| KR | 2019065963 A * | 6/2019 | | C01G 53/006 |
| KR | 2021007808 A * | 1/2021 | | C01G 53/00 |
| KR | 10-2021-0018139 A | 2/2021 | | |
| KR | 10-2021-0023145 A | 3/2021 | | |
| KR | 10-2021-0051639 A | 5/2021 | | |
| KR | 2317100 B1 * | 10/2021 | | C01G 45/1228 |
| KR | 10-2022-0109912 A | 8/2022 | | |
| WO | WO 2021/006520 A1 | 1/2021 | | |

OTHER PUBLICATIONS

EPO Extended European Search Report dated Jul. 19, 2023, issued in European Patent Application No. 22210779.9 (6 pages).
EPO Extended European Search Report dated Mar. 20, 2023, issued in European Patent Application No. 22199252.2 (7 pages).
Korean Office Action dated Aug. 30, 2024, issued in corresponding Korean Patent Application No. 10-2021-0172278 (6 pages).
Korean Office Action dated Jan. 13, 2025, issued in Korean Patent Application No. 10-2021-0129532 (12 pages).
U.S. Final Office Action for U.S. Appl. No. 17/521,709, dated Mar. 20, 2025, 21 pages.

* cited by examiner

RECHARGEABLE LITHIUM BATTERY

CROSS-REFERENCE TO RELATED APPLICATION

This application claims priority to and the benefit of Korean Patent Application No. 10-2021-0172278 filed in the Korean Intellectual Property Office on Dec. 3, 2021, the entire contents of which are hereby incorporated by reference.

BACKGROUND

1. Field

Embodiments of the present disclosure relate to a rechargeable lithium battery with secured overcharge safety.

2. Description of the Related Art

A portable information device such as a cell phone, a laptop, smart phone, and the like or an electric vehicle has used a rechargeable lithium battery having high energy density and easy portability as a driving power source. Recently, research has been actively conducted to use a rechargeable lithium battery having high energy density as a driving power source or power storage power source for hybrid or electric vehicles.

However, as the rechargeable lithium battery is commercialized in various fields, an overcharge problem in which the rechargeable lithium battery is charged in excess of a specified voltage value may occur. When overcharged, an internal pressure and a temperature of the rechargeable lithium battery may be increased due to a chemical reaction of internal materials of the battery, which may lead to accidents such as thermal runaway and the like. In order to prevent or reduce these effects, the battery may be internally equipped with a system of cutting off a current, when the internal pressure and the temperature of the battery reach a set or predetermined value or higher.

However, a temperature-sensing/current-cut-off system, which cuts off a current, when the internal temperature of the battery reaches the set or predetermined value or higher, has a problem of being operated even at a general high temperature of about 60° C. or less, and so when the operation temperature is set to be higher, the current-cut-off system is often operated late and limited in securing overcharge safety.

Another temperature-sensing/current-cut-off system, which cuts off a current, when the internal pressure of the battery reaches the set or predetermined value or higher, has a problem that the overcharge safety system does not properly work, as the internal pressure of the battery does not rise at a sufficiently fast rate even after the overcharge, leading to accidents such as explosion after the battery is left and the like. Accordingly, there is a need for a rechargeable lithium battery system equipped with a safety device that operates quickly during overcharge to secure safety of the rechargeable lithium battery.

SUMMARY

A rechargeable lithium battery having secured overcharge safety by quickly operating a safety device when overcharging exceeds a set or specified voltage value proceeds.

In an embodiment, a rechargeable lithium battery includes a positive electrode including a positive electrode active material including a secondary particle in which a plurality of primary particles are aggregated, the secondary particle having at least a portion of the primary particles radially arranged and including a lithium nickel-based composite oxide, and a boron coating layer on the surface of the secondary particle and including lithium borate; a negative electrode; a separator between the positive electrode and the negative electrode; an electrolyte including vinylene carbonate; and a case containing the positive electrode, the negative electrode, the separator, and the electrolyte.

In the rechargeable lithium battery according to an embodiment, when a large amount of gas is generated in the battery during overcharging and the pressure is sufficiently increased, an overcharge safety device operates quickly to cut off the current, and thus overcharge safety is secured. In addition, excellent performance may be realized during operation.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1A:
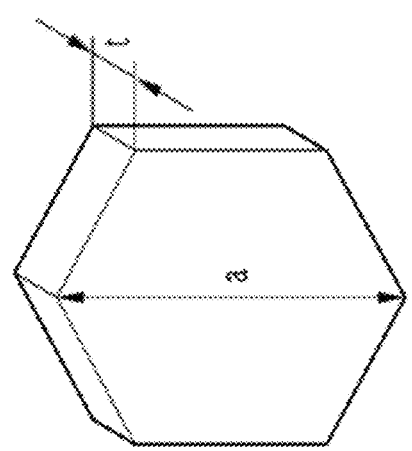
FIGS. 1A to 1C are schematic views showing shapes of plate-shaped primary particles.

Hereinafter, example embodiments will be described in more detail so that those of ordinary skill in the art can easily implement them. However, the subject matter of this disclosure may be embodied in many different forms and is not to be construed as being limited to the example embodiments set forth herein.

The terminology used herein is used to describe example embodiments only, and is not intended to limit the present disclosure. The singular expression includes the plural expression unless the context clearly dictates otherwise.

As used herein, "combination thereof" means a mixture, a laminate, composite, a copolymer, an alloy, a blend, a reaction product, and/or the like of the constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., may be exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, the term "layer," as used herein, includes not only a shape formed on the whole surface when viewed from a plan view, but also a shape formed on a partial surface.

In addition, the average particle diameter may be measured by any suitable method generally used in the art, for example, may be measured by a particle size analyzer, or may be measured by a transmission electron micrograph or a scanning electron micrograph. In some embodiments, it is possible to obtain an average particle diameter value by measuring using a dynamic light scattering method, performing data analysis, counting the number of particles for each particle size range, and calculating from the result. Unless otherwise defined, the average particle diameter may mean the diameter (D50) of particles having a cumulative volume of 50 volume % in the particle size distribution.

Herein, "or" is not to be construed as an exclusive meaning, for example, "A or B" is construed to include A, B, A+B, and the like.

In an embodiment, a rechargeable lithium battery includes, as a positive electrode active material including a lithium nickel-based composite oxide, a positive electrode including a positive electrode active material including a secondary particle in which a plurality of primary particles are aggregated together and having at least a portion of the primary particles radially arranged, and a boron coating layer on a surface of the secondary particle and including lithium borate; a negative electrode; a separator between the positive electrode and the negative electrode; an electrolyte including vinylene carbonate; and a case containing the foregoing.

When this rechargeable lithium battery is charged at an abnormal voltage of a set or specified voltage or more, for example, in a range of about 4.5 V to about 5.0 V, for example, about 4.7 V or more, or about 4.8 V or more, the battery internally generates a large amount of gas which makes an overcharge safety device quickly operate to cut off current and heat transfer, thereby, preventing or reducing accidents such as fire and/or the like. In addition, below the set or specified voltage, because there is no additional gas generation, the battery may be brought back to normal operation and exhibit excellent performance such as cycle-life characteristics and/or the like.

When an additive such as vinylene carbonate and/or the like is used in the electrolyte, a cycle-life of the battery is improved. However, in comparative batteries these electrolyte additives may have an effect of reducing the amount of generated gas during overcharge, and accordingly, because the safety device may not be operated (or not suitably operated) because the internal pressure of the battery does not rise at a sufficiently fast rate due to the presence of the electrolyte additives, there may be problems such as thermal runaway after the overcharge continues and the like if the electrolyte additives are included in the electrolyte.

In embodiments of the present disclosure, because a set positive electrode active material is concurrently (e.g., simultaneously) applied, while the vinylene carbonate is added to the electrolyte, gas may not be generated below a set or specified voltage, but only when charged at the set or specified voltage or more, for example, about 4.5 V to about 5.0 V, or about 4.7 V or more, or about 5.0 V or more, a large amount of gas is generated to make the safety device quickly operate, successfully securing overvoltage safety of the rechargeable lithium battery. In some embodiments, when the rechargeable lithium battery is charged, for example, at an overvoltage of about 5.0 V or more, the amount of gas generated per weight of the active material in the battery may be about 3 cc/g or more. The amount of gas generated may be measured by the method of Evaluation Example 4.

Positive Electrode

The positive electrode for a rechargeable lithium battery according to an embodiment may include a current collector and a positive electrode active material layer on the current collector. The positive electrode active material layer may include a positive electrode active material, and may further include a binder and/or a conductive material (e.g. an electrically conductive material).

Positive Electrode Active Material

A positive electrode active material for a rechargeable lithium battery according to an embodiment includes, a lithium nickel-based composite oxide, a secondary particle in which a plurality of primary particles are aggregated together and having at least a portion of the primary particles radially arranged, and a boron coating layer on the surface of the secondary particle and including lithium borate.

The boron coating layer may be on the surface of the secondary particle, and may be uniformly (e.g., substantially uniformly) coated on the surface of the secondary particle. Lithium borate of the boron coating layer may be expressed as lithium boron oxide, and may comprise $LiBO_2$, $Li_3B_7O_{12}$, $Li_6B_4O_9$, $Li_3B_{11}O_{18}$, $Li_2B_4O_7$, $Li_3BO_3$, $Li_8B_6O_{13}$, $Li_5B_3O_7$, $Li_4B_2O_5$, $Li_{10}B_4O_{11}$, $Li_8B_2O_7$, or a combination thereof.

A content of lithium borate in the boron coating layer may be about 0.02 wt % to about 0.5 wt %, for example, about 0.03 wt % to about 0.4 wt %, about 0.04 wt % to about 0.3 wt %, or about 0.05 wt % to about 0.2% based on the total weight of the positive electrode active material. When this content range is satisfied, the boron coating layer does not act as a resistance (e.g., does not act as a resistor that increases electrical resistance of the surface of the positive electrode active material), and may improve structural stability of the positive electrode active material, and cycle-life characteristics may be improved. In addition, lithium borate in this content range creates a synergistic effect together with vinylene carbonate in the electrolyte to generate a large amount of gas during overcharge, thereby improving overcharge safety, and exhibiting excellent performance during normal operation.

The positive electrode active material according to an embodiment may further include a boron doping layer inside the primary particles exposed on the surface of the secondary particle.

In comparative methods, when boron is coated on a positive electrode active material, a method of heat-treating a lithium metal composite oxide by mixing it together with a boron raw material in a wet or dry manner after preparing the lithium metal composite oxide may be used. However, in this case, boron acts as a resistance (e.g., acts as a resistor that increases electrical resistance of the surface of the positive electrode active material) on the surface of the positive electrode active material, and there is a problem in that capacity and cycle-life are rather deteriorated (e.g., reduced). According to embodiments of the present disclosure, when a secondary particle-type positive electrode active material in which at least a portion of primary particles are arranged is prepared in a method of adding a lithium raw material and a boron raw material together to a set positive electrode active material precursor such as nickel-based hydroxide and/or the like and then, heat-treating the mixture under set conditions, a boron coating layer and a boron doping layer may be concurrently (e.g., simultaneously) formed in the positive electrode active material. When the boron coating layer and the boron doping layer in each suitable or appropriate amount are concurrently (e.g., simultaneously) formed, boron may no more act as resistance (e.g., may not act as a resistor that increases electrical resistance of the surface of the positive electrode active material) but improve structural stability of the positive electrode active material, concurrently (e.g., simultaneously) improving capacity characteristics and high temperature cycle-life characteristics of the rechargeable lithium battery. In addition, when abnormally overcharged, the boron coating layer and the boron doping layer may help generate a large amount of gas, and thus, a safety device is quickly operated, thereby improving overcharge safety.

The boron doping layer may be said to be inside the secondary particles, for example, it may be said to be inside the primary particles exposed at the surface of the secondary particle. The primary particles exposed at the surface of the secondary particle may refer to primary particles in the outermost portion of the secondary particle. For example, the boron doping layer may be within a depth range of 10 nm from the outer surface of the primary particles exposed at the surface of the secondary particles. If the outer surface of the primary particles exposed at the surface of the secondary particles is 0 nm, it can be said that the doping layer exists in a depth range of 0 nm to 10 nm starting from the surface. In other words, the boron doping layer may be present within a depth range of about 10 nm from the surface of the secondary particles. When the secondary particle surface is about 0 nm, the doping layer may be present within a depth range of about 0 nm to about 10 nm from the surface.

The boron doping layer may be present, for example, within a depth range of about 9 nm, about 8 nm, about 7 nm, about 6 nm, about 5 nm, about 4 nm, about 3 nm, or about 2.5 nm from the outer surface of the primary particles exposed at the surface of the secondary particles. This boron doping layer may be distinguished from the boron coating layer and also, from the grain boundary boron coating portion to be described later and thus contribute to structural stability of the positive electrode active material.

In some embodiments, the positive electrode active material may further include a grain boundary boron coating portion that is on the surface of the primary particles inside the secondary particles and includes lithium borate. This grain boundary boron coating portion is present not on the surface of the secondary particles but inside the secondary particles and may be coated along the interface of the primary particles. Herein, the inner portion of the secondary particles means the entire interior except for the surface and, for example, may mean the entire interior from the outer surface to a depth of about 2 μm, or a portion where distilled water does not reach when the positive electrode active material secondary particles are washed with the distilled water.

According to an embodiment, a weight of the boron coating layer is greater than a weight of the grain boundary boron coating portion. For example, a weight of the boron coating layer may be at least 4 times a weight of the grain boundary boron coating portion. For example, based on a total amount of the boron coating layer and the grain boundary boron coating portion, the grain boundary boron coating portion may be included in an amount of about 2 wt % to about 30 wt %, for example, about 3 wt % to about 25 wt %, or about 5 wt % to about 20 wt %, and in addition, the boron coating layer may be included in an amount of about 70 wt % to about 98 wt %, about 75 wt % to about 97 wt %, about 80 wt % to about 95 wt %, or the like. For example, the boron coating layer and the grain boundary boron coating portion may have a weight ratio of about 70:30 to about 98:2, for example, about 75:25 to about 97:3, or about 80:20 to about 95:5. When the boron coating layer and the grain boundary boron coating portion are included within the above content ratios, boron may not act as resistance (e.g., may not act as a resistor that increases electrical resistance of the surface of the positive electrode active material) but improve performance, concurrently (e.g., simultaneously) improving capacity characteristics and cycle-life characteristics of the rechargeable lithium battery.

A content of the boron coating layer, for example, a content of lithium borate in the boron coating layer may be, for example, about 0.02 wt % to about 0.5 wt %, about 0.03 wt % to about 0.4 wt %, about 0.04 wt % to about 0.3 wt %, or about 0.05 wt % to about 0.2 wt % based on the total weight of the positive electrode active material. A content of the grain boundary boron coating portion, for example, a content of the lithium borate in the grain boundary boron coating portion may be, for example, about 0.001 wt % to about 0.05 wt %, about 0.001 wt % to about 0.04 wt %, about 0.002 wt % to about 0.03 wt %, or about 0.003 wt % to about 0.02 wt % based on the total weight of the positive electrode active material, but is not limited thereto. When the contents of the boron coating layer and the grain boundary boron coating portion for the positive electrode active material are the same, both the capacity characteristics and the cycle-life characteristics of the rechargeable lithium battery may be improved.

A total amount of the boron coating layer and the grain boundary boron coating portion may be about 0.1 mol % to about 5 mol %, for example, about 0.1 mol % to about 3 mol %, about 0.1 mol % to about 2.5 mol %, about 0.1 mol % to about 2 mol %, about 0.1 mol % to about 1.5 mol %, or about 0.5 mol % to about 1.3 mol % based on the total amount of the positive electrode active material. If the total amount of the boron coating layer and the grain boundary boron coating portion is out of a set or certain amount, an initial discharge capacity may decrease and cycle-life characteristics may be deteriorated. For example, if the amount of the boron coating layer present on the surface of the secondary particles is excessive, boron acts as a resistance (e.g., may act as a resistor that increases electrical resistance of the surface of the positive electrode active material) and the initial discharge capacity of the rechargeable lithium battery may be greatly reduced.

In some embodiments, the positive electrode active material includes a secondary particle in which at least two or more primary particles are aggregated, and at least a portion of the primary particles have a radially arranged structure. At least some of the primary particles may have a plate shape. The primary particles may have a thickness smaller than a long axis length. Here, the long axis length means the maximum length with respect to the widest surface of the primary particle. For example, the primary particle may have a structure in which the length (t) in one axial direction (e.g., a thickness direction) is smaller than the long axis length (a) in the other direction (e.g., a plane direction).

Figure 1B:
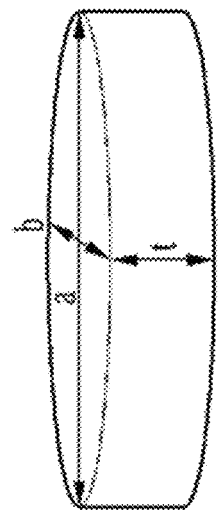
Figure 1C:
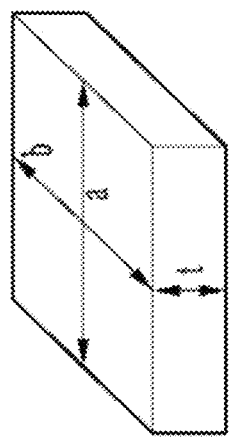
Figure 2:
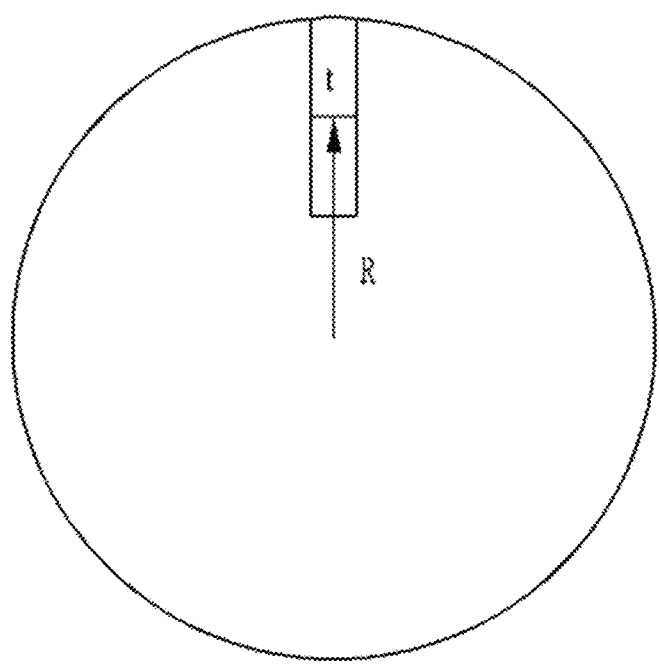
FIG. 2 is a view illustrating a secondary particle including radially arranged primary particles.

FIG. 1 is a schematic view showing embodiments the plate shape of primary particles of a first positive electrode active material. Referring to FIG. 1, the primary particles according to an embodiment have various suitable shapes while having a basic plate structure, for example, FIG. 1A shows a polygonal nanoplate shape such as a hexagon, FIG. 1B shows a nanodisk shape, and FIG. 1C shows a rectangular parallelepiped shape. In FIGS. 1A-1C, "a" means the length of the long axis of the primary particle, and "t" means the thickness of the primary particle, and in FIGS. 1B-1C "b" means the length of the short axis of the primary particle. The thickness t of the primary particles may be smaller than the lengths a and b in the plane direction. Among the lengths in the plane direction, a may be longer or equal to b. A direction in which the thickness t is defined in the primary particles is defined as a thickness direction, and a direction having lengths a and b is defined as a plane direction. In the positive electrode active material, at least a portion of the primary particles may have a radially arranged structure, and for example, long axes of the primary particles may be arranged in a radial direction. FIG. 2 is a view illustrating the definition of a radial in secondary particle according to an embodiment. In an embodiment, the term "radially arranged structure," as used herein, means that, as shown in FIG. 2, the thickness (t) direction of the primary particles is perpendicular (e.g., substantially perpendicular) to or within an angle of about ±5° of perpendicular (e.g., substantially perpendicular) to the direction (R) from the secondary particle from the center of the secondary particle to the surface.

An average length of the primary particles of the secondary particle may be about 0.01 μm to about 5 μm, for example about 0.01 μm to about 2 μm, about 0.01 μm to about 1 μm, about 0.02 μm to about 1 μm, about 0.05 μm to about 0.5 μm, or about 150 nm to about 500 nm. Here, "average length" means the average length of the long axis length (a) in the plane direction when the primary particles are plate-shaped, and when the primary particle is spherical, it means the average particle diameter.

When the primary particles are plate-shaped, an average thickness of the primary particles may be for example greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, or greater than or equal to about 900 nm, and for example less than or equal to about 5 μm, less than or equal to about 4 μm, less than or equal to about 3 μm, less than or equal to about 2 μm, less than or equal to about 1 μm, less than or equal to about 900 nm, less than or equal to about 800 nm, less than or equal to about 700 nm, less than or equal to about 600 nm, or less than or equal to about 500 nm, for example about 100 nm to about 200 nm. In addition, in the primary particle, a ratio of the average thickness to the average length may be about 1:1 to about 1:10, for example about 1:1 to about 1:8, about 1:1 to about 1:6, or about 1:2 to about 1:5.

As described above, when the average length, the average thickness, and the ratio between the average thickness and the average length of the primary particles satisfy the above ranges and at least a portion of the primary particles are radially arranged, it is possible to have relatively many lithium diffusion pathways between grain boundaries on the surface side, and a large number of crystal planes capable of lithium transfer are exposed to the outside, so that lithium diffusion is improved and high initial efficiency and capacity can be secured. In addition, when the primary particles are arranged radially, the pores exposed on the surface are directed toward the center of the secondary particles, thereby promoting diffusion of lithium. Due to the radially arranged primary particles, uniform (e.g., substantially uniform) contraction and expansion are possible when lithium is deintercalated and/or intercalated, and when lithium is deintercalated, pores exist in the (001) direction (e.g., the (001) crystal plane direction), which is the direction in which the particles expand, so that they act as a buffer. In addition, due to the size and arrangement of the primary particles, the probability of cracks occurring during contraction and expansion of the active material may be lowered (e.g., reduced), and the inner pores further alleviate the volume change to reduce the cracks generated between the primary particles during charging and discharging, resulting in improved cycle-life characteristics of a rechargeable lithium battery and reduced resistance increase phenomenon.

The positive electrode active material may have an irregular porous structure in at least one selected from the inner portion and the outer portion of the secondary particle. The term "irregular porous structure," as used herein, may refer to a structure in which the pore sizes and shapes are not regular and do not have uniformity. For example, the secondary particle may include an inner portion including an irregular porous structure and an outer portion having a radially arranged structure. In some embodiments, the primary particles in the inner portion may be arranged without regularity, unlike the primary particles in the outer portion. For example, the primary particles at the inner portion may be randomly arranged with respect to one another. The inner portion containing the irregular porous structure includes primary particles like (e.g., the same or substantially the same as) the outer portion.

A ratio of a radius of the inner portion to a radius of the secondary particle (a distance from the center to the surface of the particle) may be about 40 length % to about 60 length %, and such an area may be defined as an inner portion. For example, the inner portion of may have a radius that is 40% to 60% as long as the radius of the secondary particle. The outer portion may refer to an area from the outermost surface to about 40 length % to about 60 length % of a radius of the secondary particle. For example, the outer portion of may have a radius that is 40% to 60% as long as the radius of the secondary particle. In addition, a ratio of a volume of the outer portion to a volume of the secondary particle may be less than or equal to about 90 volume %, less than or equal to about 87 volume %, or less than or equal to about 85 volume %. For example, the outer portion may have a volume that is about 90%, less than or equal to about 87%, or less than or equal to about 85% that of the secondary particle as a whole.

The secondary particle of the positive electrode active material may include a radially-arranged outer portion and an inner portion having an irregular porous structure, wherein the inner portion of the secondary particle may have a larger pore (e.g., larger pore size or larger pore volume) than the outer portion. For example, in the positive electrode active material, the inner portion may have a pore size of about 150 nm to about 1 μm and the outer portion may have a pore size of less than about 150 nm. In this way, when the pore size of the inner portion is larger than that of the outer portion, there may be a feature of shortening a diffusion distance of lithium in the active material, compared with a secondary particle having the same pore sizes at the inner and outer portions, and lithium may be easily inserted from the outside, and in addition, there may be an effect of alleviating volume changes during the charge and discharge. Herein, the pore size means an average diameter when a pore is spherical or circular (e.g., generally spherical or circular) and a length of a long axis when the pore is oval.

The secondary particle of the positive electrode active material may have open pores on the surface and facing toward the center of the inner portion and a size of the open pores may be less than about 150 nm, for example, about 10 nm to about 148 nm. The open pores are pores of which a portion of corresponding walls are not closed and which are formed by spaces among the radially-arranged sheet-shaped primary particles and deeply connected from the surface of the secondary particles to the center. These open pores may be connected to the outside and may become a passageway through which materials can enter and exit. The open pores may be formed to a depth of less than or equal to about 150 nm, for example, about 0.001 nm to about 100 nm, for example, about 1 nm to about 50 nm on average from the surface of the secondary particles. The size and depth of the open pores may be measured by the BJH (Barrett, Joyner and Halenda) method, which is a method that utilizes the adsorption or desorption content of nitrogen.

Closed pores may exist in the inner portion of the secondary particle, and closed pores and/or open pores may exist in the outer portion. The closed pores may exclude or mostly exclude an electrolyte, while the open pores may include an electrolyte therein. The closed pores are independent pores that are not connected to other pores because all of the walls of the pores are formed in a closed structure, and the open pores are continuous pores connected to the outside of the particle because at least some of the walls of the pores are formed in an open structure.

Figure 3:
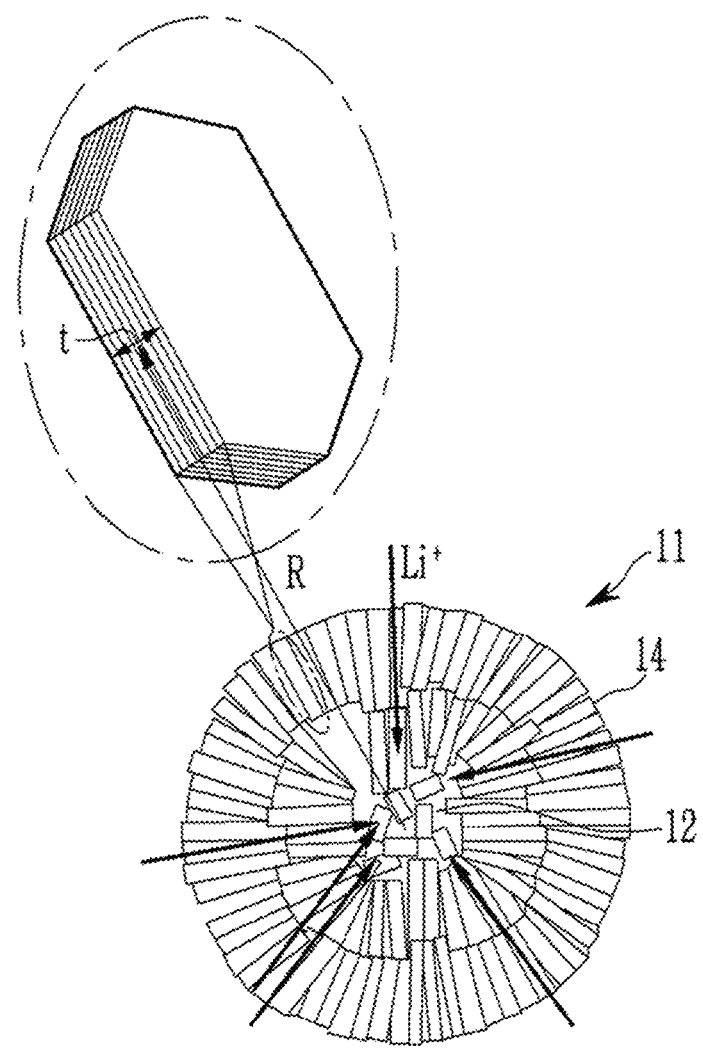
FIG. 3 is a schematic view showing a cross-sectional structure of a secondary particle according to an embodiment.

FIG. 3 is a schematic view illustrating a cross-sectional structure of secondary particles of the positive electrode active material. Referring to FIG. 3, the secondary particles 11 of the positive electrode active material according to an embodiment have an outer portion 14 having a structure in which the primary particles having a plate shape are arranged in a radial direction (e.g., a radial orientation), and an inner portion 12 in which the primary articles 13 are irregularly arranged (e.g., randomly arranged with respect to each other). The inner portion 12 may have more empty spaces between the primary particles than the outer portion. In addition, the pore size and porosity in the inner portion are large and irregular compared with the pore size and porosity in the outer portion. In FIG. 3, arrows indicate the movement direction of lithium ions.

In the secondary particle, the inner portion has a porous structure, so that the diffusion distance of lithium ions to the inner portion is reduced, and the outer portion has radial structure, so that lithium ions are easily intercalated into the surface. In addition, because the size of the primary particles is small, it is easy to secure a lithium transfer path between crystal grains. In addition, because the size of the primary particles is small and the pores between the primary particles alleviate the volume change occurring during charging and discharging, the stress caused by the volume change during charging and discharging may be minimized or reduced. Such a positive electrode active material may reduce resistance of a rechargeable lithium battery and improve capacity characteristics and cycle-life characteristics.

In some embodiments of the secondary particles, the plurality of primary particles may have a radial arrangement structure by being arranged toward a single (e.g. sole) center to make surface contact along the thickness direction of the primary particles or, in some embodiments, the secondary particles may have a "multi-center" radial arrangement structure having a plurality of centers. As such, when the secondary particles have a single-center or multi-center radial arrangement structure, lithium is easily deintercalated and/or intercalated to the center (or centers) of the secondary particles.

The secondary particles may include radial primary particles and non-radial primary particles. A content of the non-radial primary particles may be less than or equal to about 30 wt %, for example about 0.01 wt % to about 30 wt %, or about 0.1 wt % to about 20 wt %, based on the total weight of the radial primary particles and the non-radial primary particles.

The positive electrode active material includes a lithium nickel-based composite oxide. The nickel content in the lithium nickel-based composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol % and less than or equal to about 99.9 mol %, or less than or equal to about 99 mol % based on the total amount of metals other than lithium. For example, the nickel content in the lithium nickel-based composite oxide may be higher than the content of each of other metals of the lithium nickel-based composite oxide such as, for example, cobalt, manganese, and aluminum. When the nickel content satisfies the above range, the positive electrode active material may exhibit excellent battery performance while realizing a high capacity.

The lithium nickel-based composite oxide may be represented by Chemical Formula 1.

$$Li_{a1}Ni_{x1}M^1_{y1}M^2_{1-x1-y1}O_{2-z}X_z \qquad \text{Chemical Formula 1}$$

In Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ are each independently Al, B, Ba, Ca, Ce, Co, Cr, Cu, Fe, Mg, Mn, Mo, Nb, Si, Sr, Ti, V, W, Zr, or a combination thereof, and X is F, P, S, or a combination thereof.

In Chemical Formula 1, $0.4 \leq x1 \leq 1$ and $0 \leq y1 \leq 0.6$, $0.5 \leq x1 \leq 1$ and $0 \leq y1 \leq 0.5$, $0.6 \leq x1 \leq 1$ and $0 \leq y1 \leq 0.4$, or $0.7 \leq x1 \leq 1$ and $0 \leq y1 \leq 0.3$, $0.8 \leq x1 \leq 1$ and $0 \leq y1 \leq 0.2$, or $0.9 \leq x1 \leq 1$ and $0 \leq y1 \leq 0.1$.

The lithium nickel-based composite oxide may be, for example, represented by Chemical Formula 2.

$$Li_{a2}Ni_{x2}Co_{y2}M^3_{1-x2-y2}O_{2-z}X_z \qquad \text{Chemical Formula 2}$$

In Chemical Formula 2, $0.9 \leq a2 \leq 1.8$, $0.3 \leq x2 < 1$, $0 < y2 \leq 0.7$, and $0 \leq z \leq 0.1$, $M^3$ is Al, B, Ba, Ca, Ce, Cr, Cu, Fe, Mg, Mn, Mo, Nb, Si, Sr, Ti, V, W, Zr, or a combination thereof, and X is F, P, S, or a combination thereof.

In Chemical Formula 2, $0.3 \le x2 \le 0.99$ and $0.01 \le y2 \le 0.7$, $0.4 \le x2 \le 0.99$ and $0.01 \le y2 \le 0.6$, $0.5 \le x2 \le 0.99$ and $0.01 \le y2 \le 0.5$, or $0.6 \le x2 \le 0.99$ and $0.01 \le y2 \le 0.4$, $0.7 \le x2 \le 0.99$ and $0.01 \le y2 \le 0.3$, $0.8 \le x2 \le 0.99$ and $0.01 \le y2 \le 0.2$, or $0.9 \le x2 \le 0.99$ and $0.01 \le y2 \le 0.1$.

The lithium nickel-based composite oxide may be, for example, represented by Chemical Formula 3.

$$Li_{a3}Ni_{x3}Co_{y3}M^4{}_{z3}M^5{}_{1-x3-y3-z3}O_{2-z}X_z \qquad \text{Chemical Formula 3}$$

In Chemical Formula 3, $0.9 \le a3 \le 1.8$, $0.3 \le x3 \le 0.98$, $0.01 \le y3 \le 0.69$, $0.01 \le z3 \le 0.69$, $0 \le z \le 0.1$, $M^4$ is Al, Mn, or a combination thereof, $M^5$ is B, Ba, Ca, Ce, Cr, Cu, Fe, Mg, Mo, Nb, Si, Sr, Ti, V, W, Zr, or a combination thereof, and X is F, P, S, or a combination thereof.

In Chemical Formula 3, $0.4 \le x3 \le 0.98$, $0.01 \le y \le 0.59$, and $0.01 \le z3 \le 0.59$, may be $0.5 \le x3 \le 0.98$, $0.01 \le y3 \le 0.49$, and $0.01 \le z3 \le 0.49$, or $0.6 \le x3 \le 0.98$, $0.01 \le y3 \le 0.39$, and $0.01 \le z3 \le 0.39$, or $0.7 \le x3 \le 0.98$, $0.01 \le y3 \le 0.29$, and $0.01 \le z3 \le 0.29$, or $0.8 \le x3 \le 0.98$, $0.01 \le y3 \le 0.19$, and $0.01 \le z3 \le 0.19$, or $0.9 \le x3 \le 0.98$, $0.01 \le y3 \le 0.09$, and $0.01 \le z3 \le 0.09$.

Generally, as the nickel content in the positive electrode active material is increased, because cation mixing, in which $Ni^{2+}$ ions take lithium sites, also increases, capacity rather decreases, or because diffusion of lithium ions is hindered by impurities such as NiO and/or the like, a battery cycle-life may be deteriorated, and in addition, the positive electrode active material has a side reaction with an electrolyte due to the structural collapse and cracks resulting from charges and discharges, which may decrease the battery cycle-life and bring about a safety problem. In order to solve these problems, when boron is coated only on the surface of an active material in a comparative method, the boron acts as resistance (e.g., a resistor) and rather decreases capacity and deteriorates a cycle-life. On the contrary, the positive electrode active material according to an embodiment, even if a high nickel-based material is used, includes the boron coating layer and the boron doping layer suitably or appropriately and accordingly, may improve problems due to the high concentration of nickel and thus realize high capacity and concurrently (e.g., simultaneously), improve cycle-life characteristics without (e.g., substantially without) deteriorating (e.g., reducing) initial discharge capacity.

Method of Preparing Positive Electrode Active Material

In an embodiment, a method of preparing a positive electrode active material for a rechargeable lithium battery includes mixing together a nickel-based hydroxide, a lithium raw material, and a boron raw material and heat-treating the resultant.

In a comparative method, when boron is coated on a positive electrode active material, a lithium raw material is mixed together with a nickel-based hydroxide followed by heat-treating the resultant to prepare a lithium nickel-based composite oxide, and a boron source is mixed therewith by a wet or dry method followed by performing heat-treatment again. In this case, only the surface of the positive electrode active material is coated with boron, and thus boron acts as a resistance (e.g., a resistor), thereby reducing capacity and cycle-life. According to the preparing method according to embodiments of the present disclosure, a secondary particle in which at least a portion of the primary particles are radially arranged is produced, and at the same time, a boron coating layer and a boron doping layer are suitably or appropriately formed, so that boron does not act as a resistance (e.g., a resistor) to obtain a positive electrode active material that is structurally stable and has excellent cycle-life characteristics.

In the preparing method according to embodiments of the present disclosure, the nickel-based hydroxide is a precursor of the positive electrode active material, and may be expressed as a nickel metal composite hydroxide or a nickel transition metal composite hydroxide, and may be prepared by a co-precipitation method and/or the like.

The nickel-based hydroxide may be, for example, represented by Chemical Formula 11.

$$Ni_{x11}M^{11}{}_{y11}M^{12}{}_{1-x11-y11}(OH)_2 \qquad \text{Chemical Formula 11}$$

In Chemical Formula 11, $0.3 \le x11 \le 1$, $0 \le y11 \le 0.7$, and $M^{11}$ and $M^{12}$ are each independently Al, B, Ba, Ca, Ce, Co, Cr, Cu, F, Fe, Mg, Mn, Mo, Nb, P, S, Si, Sr, Ti, V, W, Zr, or a combination thereof.

As an example, the nickel-based hydroxide may be represented by Chemical Formula 12 or Chemical Formula 13.

$$Ni_{x12}Co_{y12}M^{13}{}_{1-x12-y12}(OH)_2 \qquad \text{Chemical Formula 12}$$

In Chemical Formula 12, $0.3 \le x12 < 1$, $0 < y12 \le 0.7$ $M^{13}$ is Al, B, Ba, Ca, Ce, Cr, Cu, F, Fe Mg, Mn, Mo, Nb, P, S, Si, Sr, Ti, V, W, Zr, or a combination thereof.

$$Ni_{x13}Co_{y13}M^{14}{}_{z13}M^{15}{}_{1-x13-y13-z13}(OH)_2 \qquad \text{Chemical Formula 13}$$

In Chemical Formula 13, $0.3 \le x13 \le 0.98$, $0.01 \le y13 \le 0.69$, $0.01 \le z13 \le 0.69$, $M^{14}$ is Al, Mn, or a combination thereof, and $M^{15}$ is B, Ba, Ca, Ce, Cr, Cu, F, Fe, Mg, Mo, Nb, P, S, Si, Sr, Ti, V, W, Zr, or a combination thereof.

The lithium raw material may be, for example, lithium hydroxide and/or the like, and may be mixed together to a ratio of about 0.8 mole to about 1.8 mole, or about 0.8 mole to about 1.2 mole based on 1 mole of the nickel-based hydroxide.

The boron raw material may be a compound containing boron, for example, $H_3BO_3$, $HBO_2$, $B_2O_3$, $C_6H_5B(OH)_2$, $(C_6H_5O)_3B$, $[CH_3(CH_2)_3O]_3B$, $(C_3H_7O)_3B$, $C_3H_9B_3O_6$, $C_{13}H_{19}BO_3$, or a combination thereof.

A content of the boron raw material may be about 0.1 parts by mole to about 5 parts by mole, for example about 0.1 parts by mole to about 4 parts by mole, about 0.1 parts by mole to about 3 parts by mole, about 0.1 parts by mole to about 2.9 parts by mole, about 0.1 parts by mole to about 2.5 parts by mole, about 0.1 parts by mole to about 2 parts by mole, about 0.1 parts by mole to about 1.5 parts by mole, or about 0.5 parts by mole to about 1.3 parts by mole based on 100 parts by mole of the nickel-based hydroxide. When the content of boron raw material satisfies the above range, boron does not act as a resistance (e.g., a resistor) in the positive electrode active material and may serve to improve performance of a rechargeable lithium battery, thereby improving capacity and improving cycle-life characteristics. When the content of the boron raw material is excessive, the content of the boron coating layer is excessively increased, and boron acts as a resistance (e.g., a resistor) in the positive electrode active material, thereby reducing the capacity and cycle-life of the battery.

The heat-treating may be performed at a temperature of about 650° C. to about 850° C., or about 690° C. to about 780° C. In this case, a positive electrode active material for a rechargeable lithium battery having a stable structure while including both the boron coating layer and boron doping layer may be prepared.

In addition, the heat-treating may be performed for about 5 hours to about to 25 hours, for example, about 8 hours to about 12 hours. In this case, a positive electrode active material for a rechargeable lithium battery having a stable structure including both the boron coating layer and boron doping layer is prepared.

In some embodiments, the positive electrode active material layer may further include a binder and/or a conductive material (e.g., an electrically conductive material) in addition to the aforementioned positive electrode active material.

The binder improves binding properties of positive electrode active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

A content of the binder in the positive electrode active material layer may be about 1 wt % to about 5 wt % based on the total weight of the positive electrode active material layer.

The conductive material is included to provide electrode conductivity. Any suitable electrically conductive material may be used as a conductive material unless it causes a chemical change (e.g., an unsuitable or undesirable chemical change in the rechargeable lithium battery). Examples of the conductive material may include a carbon-based material such as natural graphite, artificial graphite, carbon black, acetylene black, ketjen black, a carbon fiber, a carbon nanofiber, carbon nanotube, and the like; a metal-based material of a metal powder or a metal fiber including copper, nickel, aluminum, silver, and the like; a conductive polymer such as a polyphenylene derivative; or a mixture thereof.

A content of the conductive material in the positive electrode active material layer may be about 1 wt % to about 5 wt % based on the total weight of the positive electrode active material layer.

An aluminum foil may be used as the current collector, but is not limited thereto.

Negative Electrode

The negative electrode for a rechargeable lithium battery may include, for example, a current collector and a negative electrode active material layer on the current collector. The negative electrode active material layer may include a negative electrode active material, and may further include a binder, and/or a conductive material (e.g., an electrically conductive material).

The negative electrode active material may include a material that reversibly intercalates/deintercalates lithium ions, a lithium metal, a lithium metal alloy, a material capable of doping/dedoping lithium, and/or a transition metal oxide.

The material that reversibly intercalates/deintercalates lithium ions may include, for example crystalline carbon, amorphous carbon, or a combination thereof as a carbon-based negative electrode active material. The crystalline carbon may be non-shaped, or sheet, flake, spherical, and/or fiber shaped natural graphite and/or artificial graphite. The amorphous carbon may be a soft carbon, a hard carbon, a mesophase pitch carbonization product, calcined coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative electrode active material and/or a Sn-based negative electrode active material. The Si-based negative electrode active material may include silicon, a silicon-carbon composite, $SiO_x$ (0<x<2), and/or a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative electrode active material may include Sn, $SnO_2$, and/or a Sn—R alloy (wherein R is an alkali metal, an alkaline-earth metal, a Group 13 element, a Group 14 element, a Group 15 element, a Group 16 element, a transition metal, a rare earth element, and a combination thereof, but not Sn). At least one of these materials may be mixed together with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The silicon-carbon composite may be, for example, a silicon-carbon composite including a core including crystalline carbon and silicon particles and an amorphous carbon coating layer on the surface of the core. The crystalline carbon may be artificial graphite, natural graphite, or a combination thereof. The amorphous carbon precursor may include a coal-based pitch, mesophase pitch, petroleum-based pitch, coal-based oil, petroleum-based heavy oil, and/or a polymer resin such as a phenol resin, a furan resin, and/or a polyimide resin. In this case, the content of silicon may be about 10 wt % to about 50 wt % based on the total weight of the silicon-carbon composite. In addition, the content of the crystalline carbon may be about 10 wt % to about 70 wt % based on the total weight of the silicon-carbon composite, and the content of the amorphous carbon may be about 20 wt % to about 40 wt % based on the total weight of the silicon-carbon composite. In addition, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in this case, an atomic content ratio of Si:O in the silicon particles indicating a degree of oxidation may be about 99:1 to about 33:67. The silicon particles may be $SiO_x$ particles, and in this case, the range of x in $SiO_x$ may be greater than about 0 and less than about 2. As used herein, when a definition is not otherwise provided, an average particle diameter (D50) indicates a particle where an accumulated volume is about 50 volume % in a particle distribution.

The Si-based negative electrode active material or Sn-based negative electrode active material may be mixed together with the carbon-based negative electrode active material. When the Si-based negative electrode active material or Sn-based negative electrode active material and the carbon-based negative electrode active material are mixed together and used, the mixing ratio may be a weight ratio of about 1:99 to about 90:10.

In the negative electrode active material layer, the negative electrode active material may be included in an amount of about 95 wt % to about 99 wt % based on the total weight of the negative electrode active material layer.

In an embodiment, the negative electrode active material layer may further include a binder, and may optionally further include a conductive material (e.g., an electrically conductive material). The content of the binder in the negative electrode active material layer may be about 1 wt % to about 5 wt % based on the total weight of the negative electrode active material layer. In addition, when the conductive material is further included, the negative electrode active material layer may include about 90 wt % to about 98 wt % of the negative electrode active material, about 1 wt % to about 5 wt % of the binder, and about 1 wt % to about 5 wt % of the conductive material.

The binder serves to well adhere the negative electrode active material particles to each other and also to adhere the negative electrode active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluoro rubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting viscosity (e.g., capable of increasing viscosity) may be further included. As the cellulose-based compound, one or more of carboxymethyl cellulose, hydroxypropylmethyl cellulose, methyl cellulose, or alkali metal salts thereof may be mixed together and used. As the alkali metal, Na, K or Li may be used. The amount of such a thickener used may be about 0.1 parts by weight to about 3 parts by weight based on 100 parts by weight of the negative electrode active material.

The conductive material is included to provide electrode conductivity (e.g., electrical conductivity). Any suitable electrically conductive material may be used as a conductive material unless it causes a chemical change (e.g., an unsuitable or undesirable change in the rechargeable lithium battery). Examples of the conductive material include a carbon-based material such as natural graphite, artificial graphite, carbon black, acetylene black, ketjen black, a carbon fiber, a carbon nanofiber, carbon nanotube, and the like; a metal-based material of a metal powder and/or a metal fiber including copper, nickel, aluminum silver, and the like; a conductive polymer such as a polyphenylene derivative; and/or a mixture thereof.

The current collector may include one selected from a copper foil, a nickel foil, a stainless steel foil, a titanium foil, a nickel foam, a copper foam, a polymer substrate coated with a conductive metal (e.g., an electrically conductive metal), and a combination thereof.

Electrolyte

The electrolyte according to an embodiment includes vinylene carbonate (VC). The vinylene carbonate in the electrolyte is considered to generate a large amount of gas only during overvoltage charging, and there is no (or substantially no) gas generation in the normal voltage range due to the combination with the positive electrode active material according to the embodiment.

The vinylene carbonate may be included in an amount of about 0.1 wt % to about 5 wt %, for example, about 0.2 wt % to about 4 wt %, about 0.5 wt % to about 3 wt %, or about 0.8 wt % to about 2 wt % based on the total weight of the electrolyte. When vinylene carbonate is included in the above range, safety may be secured by increasing the amount of gas generated during overcharging while improving general performance such as cycle-life characteristics of the battery.

The electrolyte may further include a non-aqueous organic solvent and a lithium salt in addition to vinylene carbonate.

Herein, a content of the vinylene carbonate may be about 0.1 parts by weight to about 5 parts by weight, about 0.3 parts by weight to about 4 parts by weight, about 0.5 parts by weight to about 3 parts by weight, or about 0.8 parts by weight to about 2 parts by weight based on the total weight, 100 parts by weight of the non-aqueous organic solvent and the lithium salt.

The non-aqueous organic solvent serves as a medium for transmitting ions taking part in the electrochemical reaction of a battery. The non-aqueous organic solvent may be a carbonate-based, ester-based, ether-based, ketone-based, and/or alcohol-based solvent, and/or aprotic solvent. The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may be methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may be dibutyl ether, tetraglyme, diglyme, dimethoxyethane, 2-methyltetrahydrofuran, tetrahydrofuran, and/or the like and the ketone-based solvent may be cyclohexanone, and/or the like. In addition, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, and/or an ether bond), amides such as dimethylformamide, dioxolanes such as 1,3-dioxolane, sulfolanes, and/or the like.

The non-aqueous organic solvent may be used alone or in a mixture. When the organic solvent is used in a mixture, the mixture ratio may be controlled in accordance with a suitable or desirable battery performance.

In addition, in the case of the carbonate-based solvent, a mixture of a cyclic carbonate and a chain carbonate may be used. In this case, when the cyclic carbonate and the chain carbonate are mixed together to a volume ratio of about 1:1 to about 1:9, the electrolyte may exhibit excellent performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed together to a volume ratio of about 1:1 to about 30:1.

As the aromatic hydrocarbon-based solvent, an aromatic hydrocarbon-based compound represented by Chemical Formula I may be used.

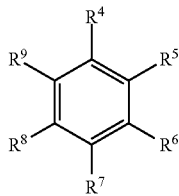

Chemical Formula I

In Chemical Formula I, $R^4$ to $R^9$ are the same or different and are selected from hydrogen, a halogen, a C1 to C10 alkyl group, a haloalkyl group, and a combination thereof.

Examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an ethylene carbonate-based compound of Chemical Formula II in order to improve cycle-life of a battery.

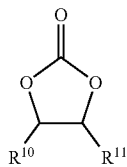

Chemical Formula II

In Chemical Formula II, $R^{10}$ and $R^{11}$ are the same or different, and are selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both of $R^{10}$ and $R^{11}$ are not hydrogen.

Examples of the ethylenecarbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be used within a suitable or appropriate range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide; LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, (wherein x and y are natural numbers, for example, an integer ranging from 1 to 20), lithium difluoro (bisoxolato) phosphate, LiCl, LiI, $LiB(C_2O_4)_2$ (lithium bis(oxalato) borate; LiBOB), and lithium difluoro(oxalato) borate (LiDFOB).

The lithium salt may be used in a concentration in a range from about 0.1 M to about 2.0 M. When the lithium salt is included at the above concentration range, an electrolyte may have excellent performance and lithium ion mobility due to suitable or optimal electrolyte conductivity and viscosity.

Separator

The separator separates a positive electrode and a negative electrode and provides a transporting passage for lithium ions and may be any suitable, generally-used separator in a lithium ion battery. In other words, it may have low resistance to ion transport and excellent impregnation for an electrolyte. For example, separator may be selected from a glass fiber, polyester, Teflon, polyethylene, polypropylene, polytetrafluoroethylene, or a combination thereof. It may have a form of a non-woven fabric or a woven fabric. For example, in a lithium ion battery, a polyolefin-based polymer separator such as polyethylene and polypropylene may be mainly used. In order to ensure the heat resistance or mechanical strength, a coated separator including a ceramic component or a polymer material may be used. Optionally, it may have a mono-layered or multi-layered structure.

Rechargeable Lithium Battery

Figure 4:
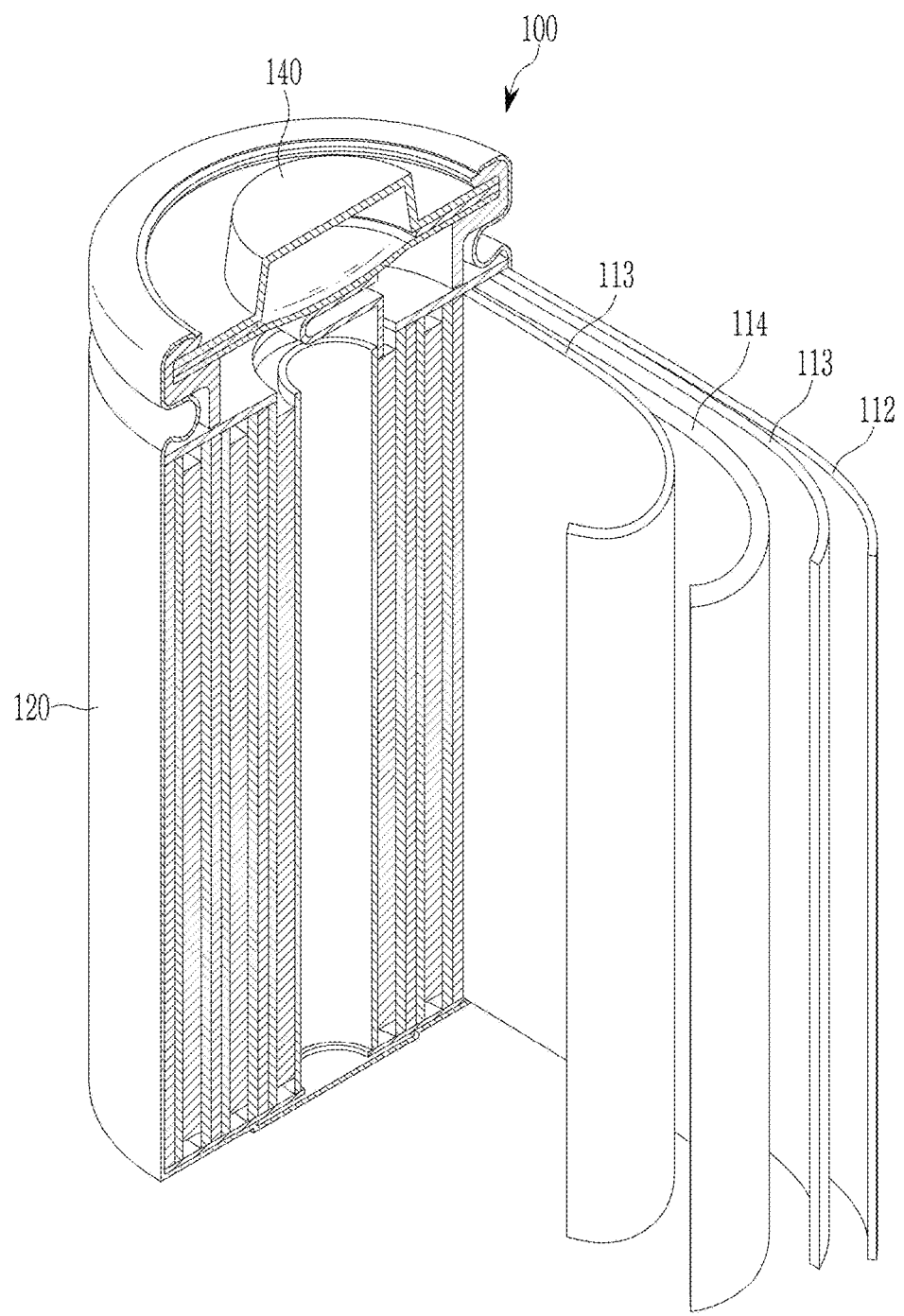
FIG. 4 is a cross-sectional view schematically illustrating a rechargeable lithium battery according to an embodiment.

FIG. 4 is a schematic view illustrating a rechargeable lithium battery according to an embodiment. Referring to FIG. 4, rechargeable lithium battery 100 according to an embodiment includes a positive electrode 114; a negative electrode 112 facing the positive electrode 114; a separator 113 between the positive electrode 114 and the negative electrode 112; an electrolyte impregnating the positive electrode 114, the negative electrode 112, and the separator 113; a case 120 containing them; and a sealing member 140 sealing the case 120.

In addition, the rechargeable lithium battery may be provided with an overcharge safety device in the case portion. The overcharge safety device may be, for example, a device that induces a short circuit when an internal pressure of the battery exceeds a set or predetermined value, for example, a pressure-response short circuit device, and/or a pressure-response circuit opening device that induces an open circuit when the internal pressure of the battery exceeds a set or predetermined value. The overcharge safety device may operate, for example, when the internal pressure of the rechargeable lithium battery is greater than or equal to about 7 kgf/$cm^2$.

The pressure-response circuit opening device is a current interrupting device that blocks charging, when the internal pressure inside the battery exceeds a set or predetermined value, due to problems that the temperature thereof is higher than a set or predetermined value or more, that a voltage of the battery is higher than a set or predetermined value or more, and/or the like. The pressure-response circuit opening device may be configured, for example, when a battery internal pressure excessively rises, to make a type (e.g., kind) of metal plate on outer walls of the case may expand upward, and thus, block external and internal electric circuits. The rechargeable lithium battery according to an embodiment, as gas is rapidly generated during the overcharge, and thus, makes the open circuit device quickly operate, may be no longer charged, and thus, suitably or effectively blocks or reduces overcharge.

The pressure-response short circuit device may induce an internal short circuit and discharge the electrode when the gas pressure inside the battery exceeds a set or predetermined value due to problems such as when a temperature of the battery exceeds a set or predetermined value and/or a voltage of the battery becomes greater than or equal to a set or predetermined value. The pressure-response short circuit device may be, for example, configured to generate a short circuit between positive and negative electrodes, when a battery internal pressure excessively rises and makes a type of metal panel attached on outer walls of the case expands upwards and contact with a part with a different potential. Overcharging of the rechargeable lithium battery according to an embodiment may be effectively prevented or reduced, as gas is rapidly generated in the battery during the overvoltage charging, and thus, makes the pressure-response short circuit device quickly operate and electrode plates discharge. When the pressure-response short circuit device is applied, the rechargeable lithium battery may further include a thermal cutoff (TCO) device such as a fuse, a positive thermal cutoff (PTC), a bimetal, a breaker, and the like to control heat generation due to the discharging.

A rechargeable lithium battery may be classified as a lithium ion battery, a lithium ion polymer battery, a lithium polymer battery, or all-solid-state battery depending on the presence or absence of a separator and type of electrolyte. According to the shape, a rechargeable lithium battery may be classified into a cylindrical shape, a square shape, a coin type, a pouch type, or the like. Any suitable structures and manufacturing methods for lithium ion batteries generally used in the art may be used for the subject matter of the present disclosure.

The rechargeable lithium battery according to an embodiment may be used in an electric vehicle (EV), and/or a hybrid vehicle such as a plug-in hybrid electric vehicle (PHEV) and/or the like due to a high capacity, improved storage stability at a high temperature and cycle-life characteristics, high rate capability, and improved overcharge safety.

Hereinafter, examples of the present disclosure and comparative examples are described. It is to be understood, however, that the examples are for the purpose of illustration and are not to be construed as limiting the present disclosure.

Example 1

5. Preparation of Positive Electrode Active Material Precursor

A positive electrode active material precursor was prepared through the following co-precipitation method. Nickel sulfate, cobalt sulfate, and aluminum nitrate were used as metal raw materials. In addition, ammonia water ($NH_4OH$) and sodium hydroxide (NaOH) as a precipitating agent were prepared to form a complex.

[First step: 1.5 $kW/m^3$, $NH_4OH$ 0.35 M, pH 11.5 to 11.7, and reaction time of 6 hours]

First, ammonia water having a concentration of 0.35 M was put in a reactor. While a metal raw material and a complex agent were added thereto respectively at 85 ml/min and 9 ml/min at 50° C. under a stirring power of 1.5 $kW/m^3$, a reaction was started. While NaOH was added thereto to maintain pH, the reaction was performed for 6 hours. As a result of the reaction, it was confirmed that the average size of the obtained core particles was in the range of about 6.5 µm to 7.5 µm, and the second step was performed as follows.

[Second step: 1.0 $kW/m^3$, $NH_4OH$ 0.40 M, pH 11.5 to 11.7, and reaction time of 16 hours]

The metal raw material and the complex agent are added thereto respectively at 107 ml/min and 13 ml/min, while the reaction temperature was maintained at 50° C., so that the complex agent maintained a concentration of 0.40 M. While adding NaOH thereto in order to maintain pH, the reaction was performed for 16 hours. At this time, the stirring power was lowered to 1.0 $kW/m^3$, which was lower than the first step, and the reaction proceeds. By carrying out this reaction, it was confirmed that the average size of the product particles containing the core and the intermediate layer was 10.5 µm to 11.5 µm, and the third step was performed as follows.

[Third step: 0.5 $kW/m^3$, $NH_4OH$ 0.40 M, pH 11.5 to 11.7, and reaction time of 5 hours]

While maintaining the reaction temperature of 50° C., the metal raw material and the complex agent were added at the rates of 142 ml/min and 17 ml/min, respectively, so that the concentration of the complex agent was maintained the same as in the second step. While adding NaOH to maintain the pH, the reaction was carried out for 5 hours so that the average particle size reached 14 µm. At this time, the stirring power was lowered to 0.5 $kW/m^3$, which was lower than in the second step, and the reaction proceeded.

Post-Process

Figure 5:
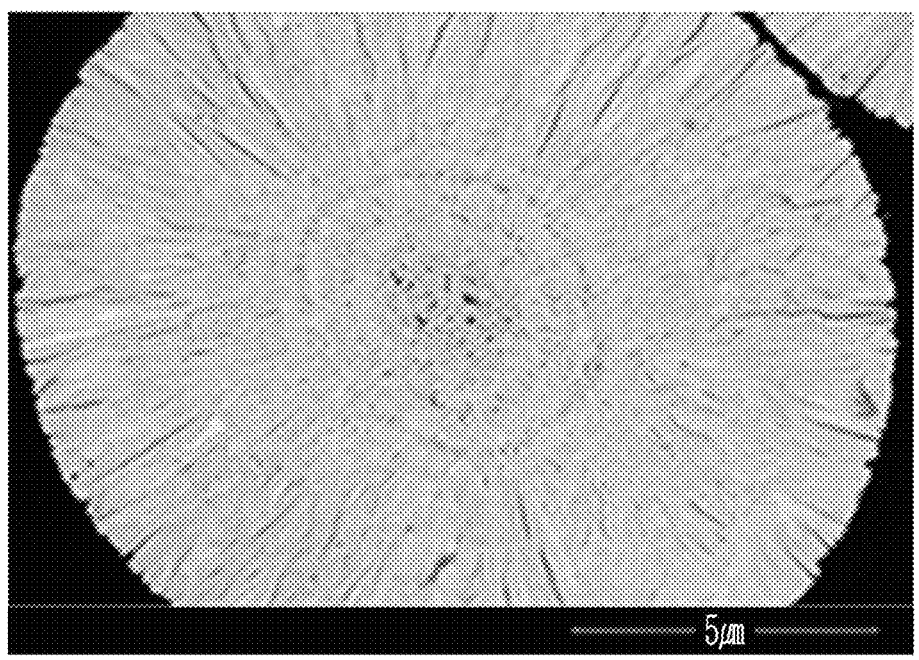
FIG. 5 is a scanning electron microscope (SEM) image of a cross section of the positive electrode active material precursor prepared in Example 1.

After washing the resultant, the resultant was dried with hot air at about 150° C. for 24 hours to obtain nickel-based hydroxide ($Ni_{0.945}Co_{0.04}Al_{0.015}OH$), which was a precursor of the positive electrode active material. FIG. 5 is a SEM image of a cross section of the positive electrode active material precursor prepared in Example 1.

2. Preparation of Positive Electrode Active Material

Figure 6:
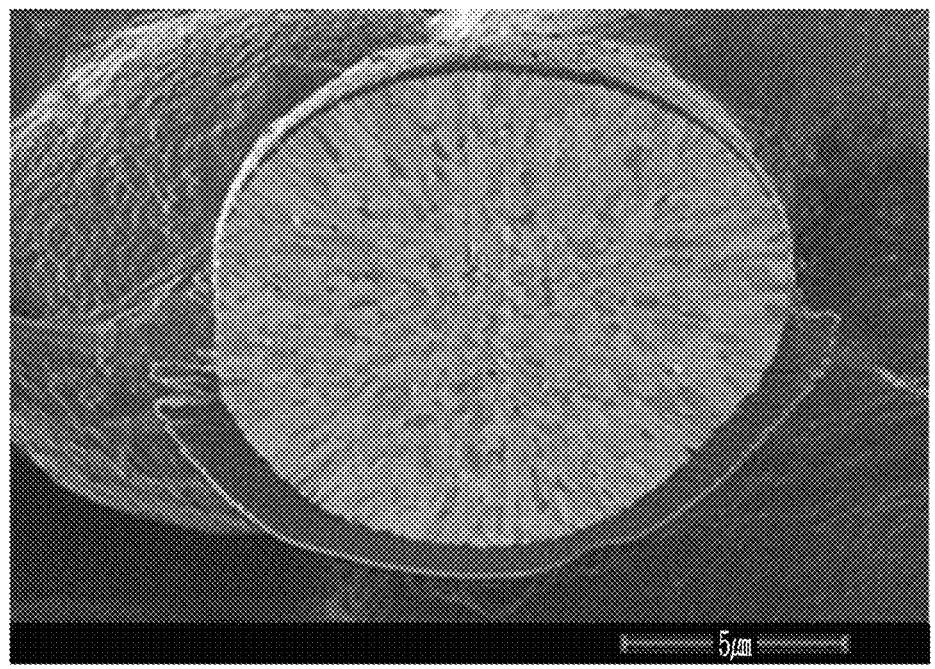
FIG. 6 is an SEM image of a cross-section of the positive electrode active material prepared in Example 1.

The obtained nickel-based hydroxide and LiOH were mixed together to a mole ratio of 1:1, 1.0 part by mole of boric acid based on 100 parts by mole of the nickel-based hydroxide was added thereto and then, heat-treated at 725° C. for 10 hours under an oxygen atmosphere, obtaining a positive electrode active material. FIG. 6 is an SEM image of a cross-section of the positive electrode active material prepared in Example 1. Referring to FIG. 6, the positive electrode active material had a secondary particle structure in which a plurality of primary particles were aggregated, wherein the primary particles were radially arranged with a porous center therein.

3. Manufacture of Positive Electrode 96 wt % of the obtained positive electrode active material, 2 wt % of polyvinylidene fluoride, 2 wt % of carbon nanotube, and N-methylpyrrolidone as a solvent were mixed together in a mixer to prepare slurry for a positive electrode active material layer. The slurry for a positive electrode active material layer was coated on an aluminum foil onto an electrode plate, dried at 135° C. for 3 hours or more, and then, pressed and vacuum-dried, manufacturing a positive electrode.

4. Manufacture of Negative Electrode

Negative active material slurry was prepared by mixing together 97.3 wt % of graphite as a negative electrode active material, 0.5 wt % of denka black, 0.9 wt % of carboxylmethyl cellulose, and 1.3 wt % of styrenebutadiene rubber in an aqueous solvent. The negative electrode active material slurry was coated on a copper foil, dried, and pressed, manufacturing a negative electrode.

5. Manufacture of Battery Cell

The positive electrode, a separator having a polyethylene/polypropylene multi-layer structure, and the negative electrode were sequentially stacked and then, housed in a case equipped with an overcharge safety device, and then, an electrolyte was injected thereinto, manufacturing a rechargeable lithium battery cell. The electrolyte was prepared by adding 1.5 parts by weight of vinylene carbonate to 100 parts by weight of an electrolyte solution prepared by adding 1.1 M LiPF$_6$ lithium salt in a solvent of ethylene carbonate, ethylmethyl carbonate, and dimethyl carbonate mixed together to a volume ratio of 2:4:4.

Comparative Example 1

A positive electrode active material composed of secondary particles coated with cobalt was prepared by mixing LiNi$_{0.945}$Co$_{0.04}$Al$_{0.015}$O$_2$ composed of general secondary particles and having a particle diameter of about 14 μm together with 3 mol % of cobalt oxide and then, heat-treating the mixture at about 700° C. for 15 hours under an oxygen atmosphere in a furnace and cooling it to room temperature. A positive electrode, a negative electrode, and a battery cell were manufactured in substantially the same method as in Example 1 except that the aforementioned positive electrode active material of Comparative Example 1 was used.

Comparative Example 2

A positive electrode active material, a positive electrode, a negative electrode, and a battery cell were manufactured in substantially the same method as in Example 1 except that the positive electrode active material was prepared without adding boric acid, such that no boron coating was present.

Comparative Example 3

A positive electrode active material was prepared by mixing 100 parts by mole of the positive electrode active material (LiNi$_{0.945}$Co$_{0.04}$Al$_{0.015}$O$_2$) of Comparative Example 2 together with 1.0 part by mole of boric acid and heat-treating the mixture at 350° C. for 8 hours under an oxygen atmosphere to coat a boron compound in a comparative manner. A positive electrode and a battery cell were manufactured in substantially the same method as in Example 1 except for this positive electrode active material of Comparative Example 3 was used.

Evaluation Example 1: Evaluation of Boron Coating Layer

Figure 7:
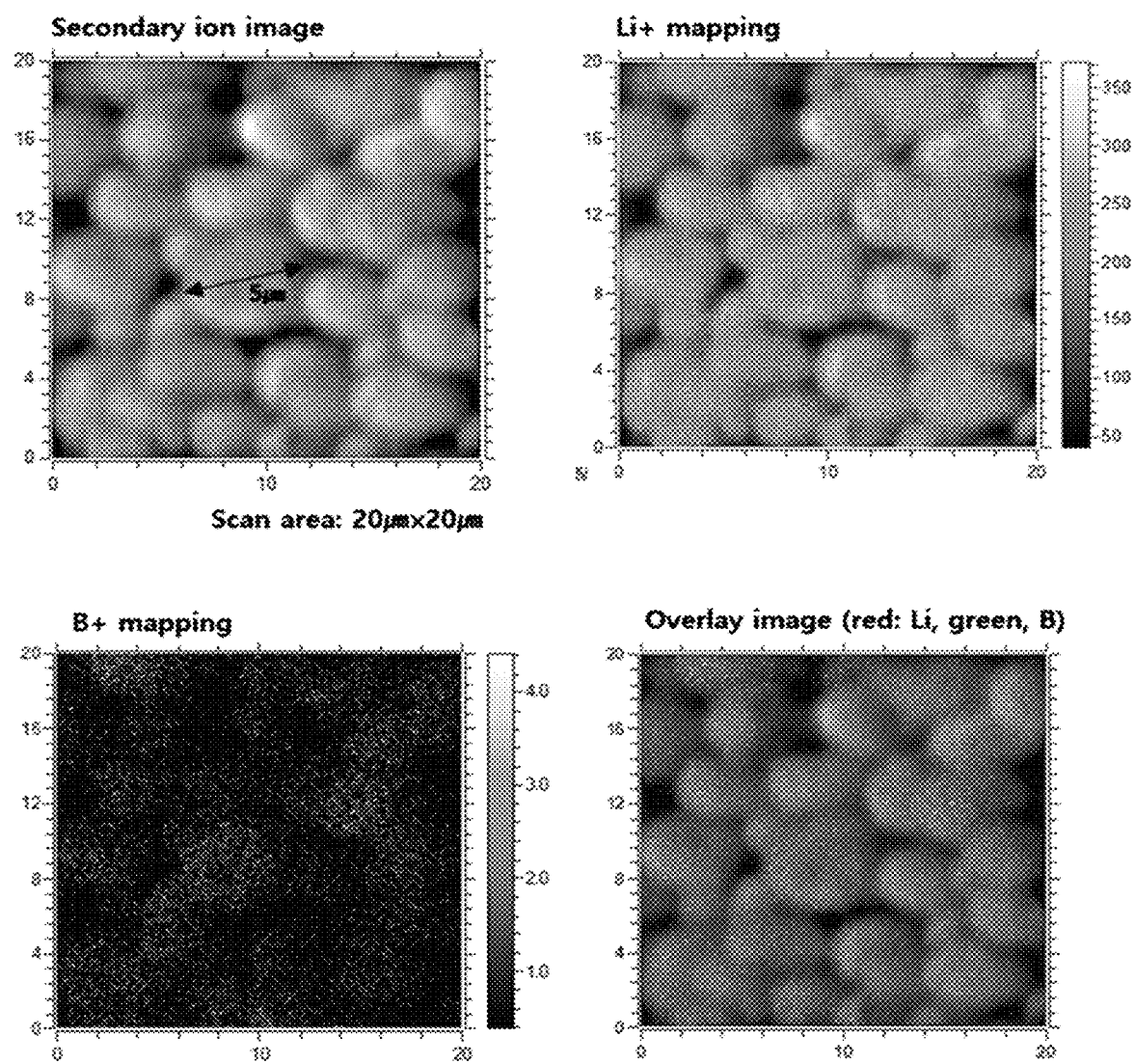
FIG. 7 is a time-of-flight secondary ion mass spectrometry (ToF-SIMS) analysis image of the surface of the positive electrode active material of Example 1.
Figure 8:
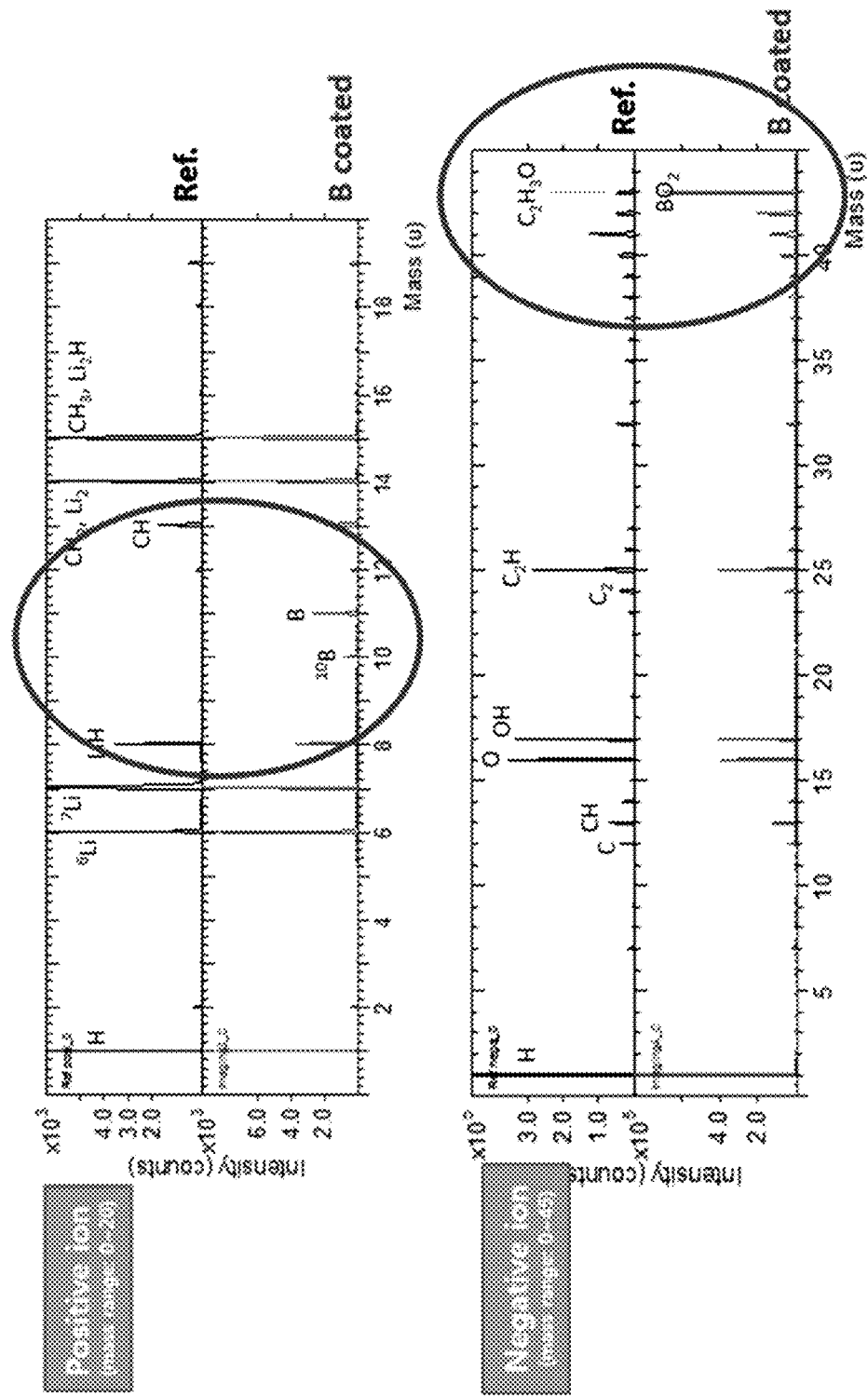
FIG. 8 is a mass spectrum result of the ToF-SIMS analysis of FIG. 7.

FIG. 7 is a ToF-SIMS (Time-of-Flight Secondary Ion Mass Spectrometry) analysis image of the surface of the positive electrode active material of Example 1, and FIG. 8 is a mass spectrum result of the ToF-SIMS analysis of FIG. 7. FIG. 7 shows that boron elements were evenly distributed on the surface of the positive electrode active material, and FIG. 8 shows that boron compounds in the form of BO$_2$ was found. Accordingly, a lithium boron compound was evenly coated on the surface of the positive electrode active material of Example 1 wherein lithium borate such as LiBO$_2$ and the like was a main component.

Figure 9:
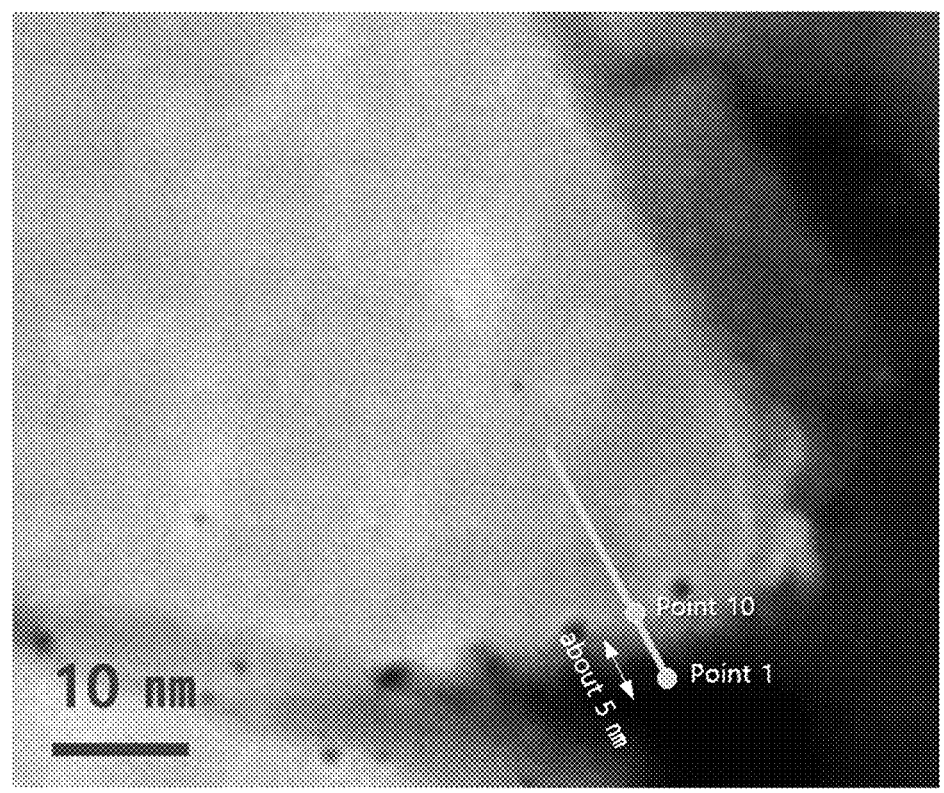
FIG. 9 is a transmission electron microscope (TEM) image of the primary particles exposed at the surface of the secondary particle in the positive electrode active material of Example 1.
Figure 10:
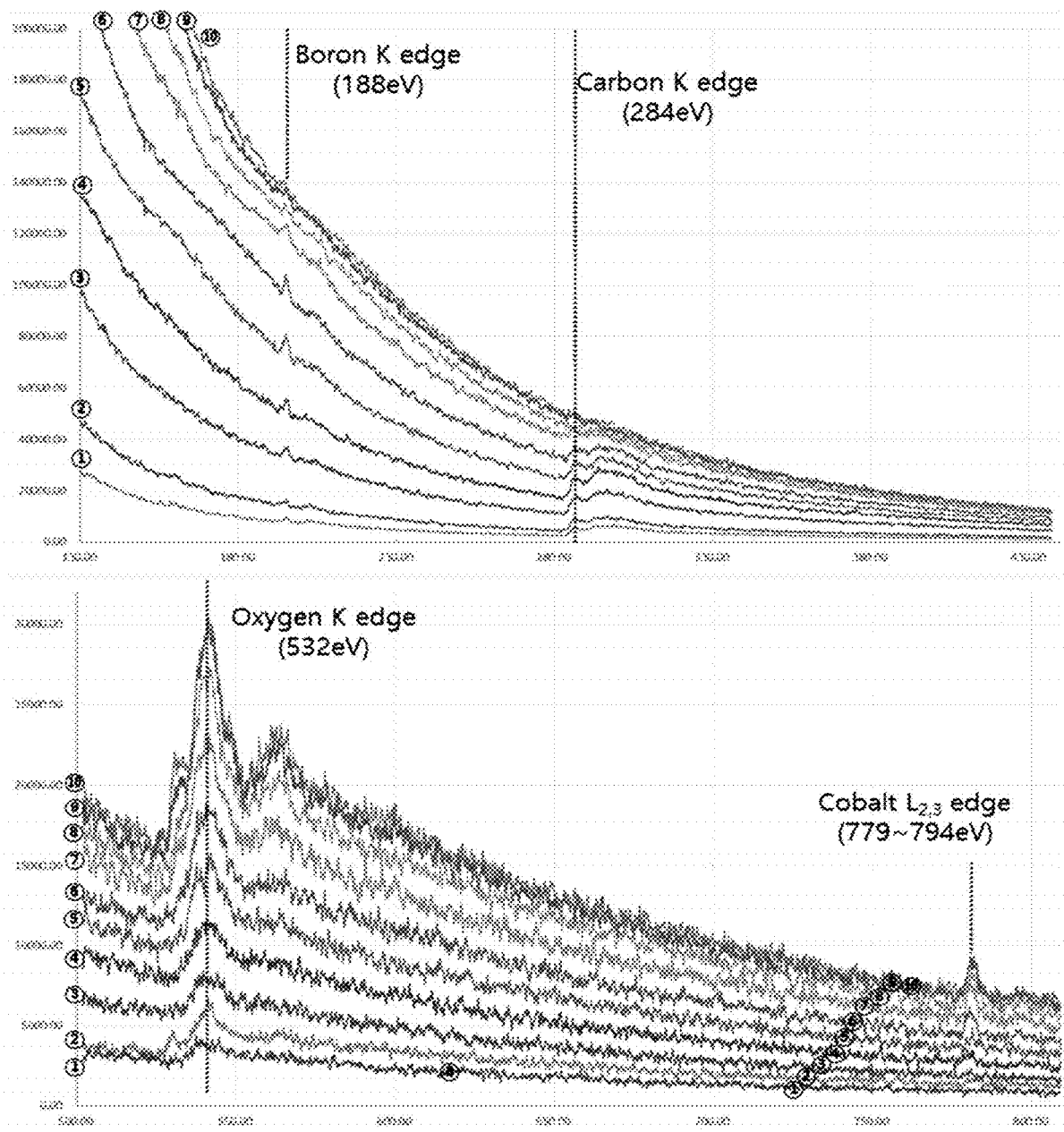
FIG. 10 is a transmission electron microscope-electron energy loss spectroscopy (TEM-EELS) analysis graph for a total of 10 points from point 1 to point 10 shown in FIG. 9.

Evaluation Example 2: Confirmation of Boron Doping Layer Through TEM-EELS Analysis FIG. 9 is a TEM image of the primary particles, that is, primary particles in the outermost portion of the secondary particles exposed to the surface of the secondary particles in the positive electrode active material of Example 1. Electron energy loss spectroscopy (EELS) was performed at a total of 10 points from point 1 to point 10 marked in FIG. 9, and the results are shown in FIG. 10. In FIG. 10, for example, ① indicates an analysis graph at the point 1. Referring to the lower graph of FIG. 10, cobalt was detected from the point 4, that is, from the point 4 to the point 10. Accordingly, a starting point of the surface of the active material may be approximately point 4. Referring to the upper graph of FIG. 8, boron was detected from point 3 to point 8. Herein, the boron detected from the point 3 could come from a boron coating layer on the surface of the active material, while the boron from the point 4 to the point 8 was from the inside of the active material, which shows that the boron inside the active material was a very thin boron doping layer.

Evaluation Example 3: Evaluation of Boron Content of Boron Coating Layer and Grain Boundary Boron Coating Portion ICP (inductively coupled plasma) emission spectroscopic analysis was performed on the positive electrode active material prepared in Example 1 to measure the content of boron. Then, 10 g of each positive electrode active material was added to 100 g of distilled water and then, stirred for 30 minutes and filtered with a filter to obtain the positive electrode active material. Through this washing process, boron on the surface of the positive electrode active material was all removed. The recovered positive electrode active material was dried at 130° C. for 24 hours and then a content of boron remaining in the positive electrode active material was measured through an ICP emission spectroscopic analysis again. This boron content was expressed as a boron content of 'inner portion.'

This means the content of the grain boundary boron coating portion. In addition, a difference obtained by subtracting the boron content after the washing from the boron content before the washing, that is, a boron content removed through the washing was expressed as a boron content of the 'outer portion.'

This means the content of the boron coating layer.

Figure 11:
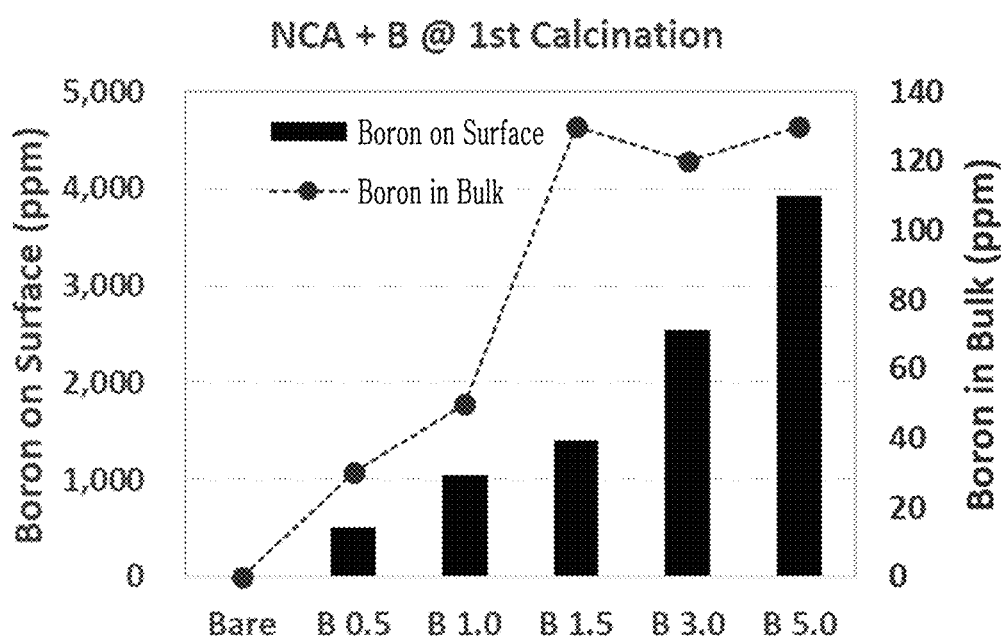
FIG. 11 is a graph showing the boron content of the boron coating layer (outside) and the grain boundary boron coating portion (inside) according to the boron input amount measured through inductively coupled plasma (ICP) emission spectroscopy.

The positive electrode active materials of the examples, which were prepared by using substantially the same method as in Example 1 but changing the input amount of boric acid (1.0 part by mole in Example 1) into 0 part by mole, 0.5 parts by mole, 1.5 parts by mole, 3.0 parts by mole, and 5.0 parts by mole, were analyzed with respect to boron contents of the inner portion and outer portion, and the results are shown in FIG. 11. In FIG. 11, the unit ppm may indicate 10$^{-4}$ wt %, which is a weight ratio of boron to a total weight of a positive electrode active material.

Referring to FIG. 11, Example 1, in which the boron input amount was 1.0 part by mole, exhibited an external boron amount of about 1000 ppm, that is, 0.1 wt % (boron coating layer) based on the total amount of the positive electrode active material and an internal boron (grain boundary boron coating portion) amount of about 50 ppm, that is, 0.005 wt %, based on the total amount of the positive electrode active material. Herein, a weight ratio of the boron of the inner portion:outer portion was calculated to be about 95:5. In addition, in FIG. 11, when the boron input amount was 1.5 parts by mole, the boron weight ratio of the inner portion:outer portion was calculated to be about 92:8. Referring to FIG. 11, the boron compound such as lithium borate and the like was coated to inner grain boundaries as well as the surfaces of positive electrode active material secondary particles, wherein the boron content on the surface was four times or more of the boron content on the inner grain boundaries.

Evaluation Example 4: 5V Overcharge Evaluation

Figure 12:
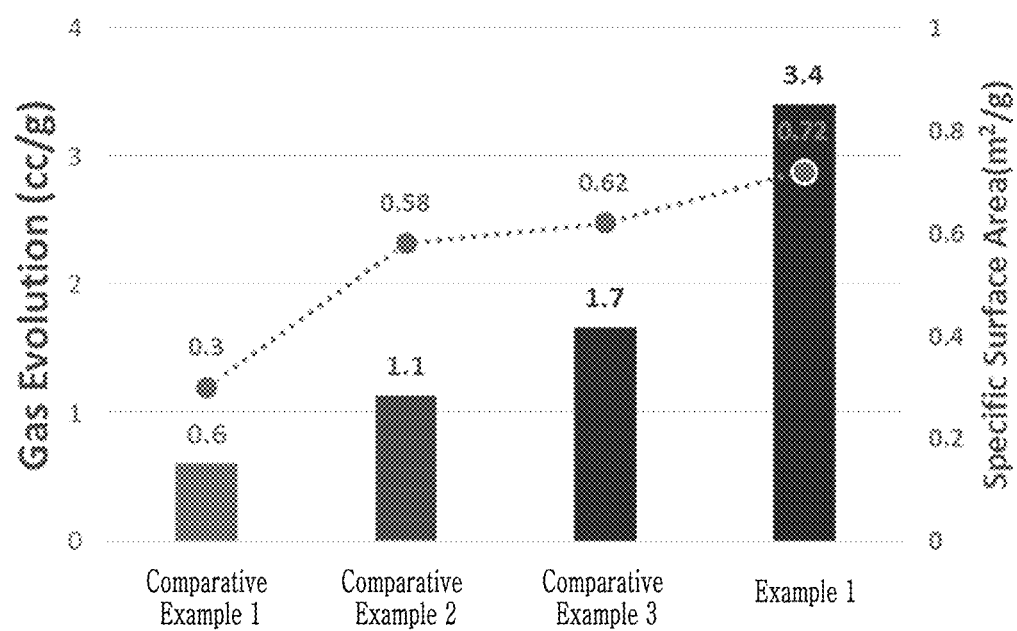
FIG. 12 is a graph illustrating the evaluation of amounts of gas generated in the battery cells during overcharging with respect to the battery cells of Example 1 and Comparative Examples 1 to 3.

The battery cells according to Comparative Examples 1 to 3 and Example 1 were charged at a constant current rate of 0.5 C to 5.0 V and cut off at a 0.1 C rate in the constant voltage mode at 25° C. Herein, a gas emission amount per weight (cc/g) of a positive electrode active material in the battery cells was measured, and the results are shown in FIG. 12. As for a C rate of the overcharge, based on estimated capacity, capacity measured by conducting a constant current charge at a 0.2 C rate to 4.3 V, a constant voltage charge to a current of 0.05 C and then, 10 minutes' pause, and a constant current discharge at 0.2 C rate to 3 V as a reference of 1 C rate.

Referring to FIG. 12, Example 1 exhibited 3.4 cc/g of a gas emission amount per weight of a positive electrode active material weight during the overcharge of 5 V, which was a superbly larger gas amount than the 1.7 cc/g or less of Comparative Examples 1 to 3. Accordingly, the battery cell of Example 1 was expected to secure safety by quickly operating the safety device in case of the overcharge.

In addition, Comparative Example 3 in which the positive electrode active material had a high specific surface area of 0.6 m²/g or more exhibited a lower gas emission amount than that of Example 1, and thus, did not have a sufficient effect in terms of the gas emission amount according to the specific surface area increase.

Evaluation Example 5: Current Evaluation During Overvoltage Charging

The positive electrode plate of Example 1 was punched out into a 14 mm circle, which was used as a positive electrode, and lithium was used as a negative electrode, making a three-electrode beaker cell. In this beaker, an electrolyte solution including vinylene carbonate in substantially the same manner as in Example 1 was put, which was referred to as Example 2. The cell of Example 2 was checked with respect to a current change, while a voltage was increased at a constant rate.

In addition, a cell of Comparative Example 4 was prepared in substantially the same manner as in Example 2 except that the electrolyte solution including no vinylene carbonate was used. In addition, a cell of Reference Example A was prepared in substantially the same manner as in Example 2 except that $LiBO_2$ was used as a positive electrode instead of the positive electrode of Example 2. In addition, a cell of Reference Example B was prepared in substantially the same manner as in Reference Example A except that the electrolyte including no vinylene carbonate was used.

Figure 13:
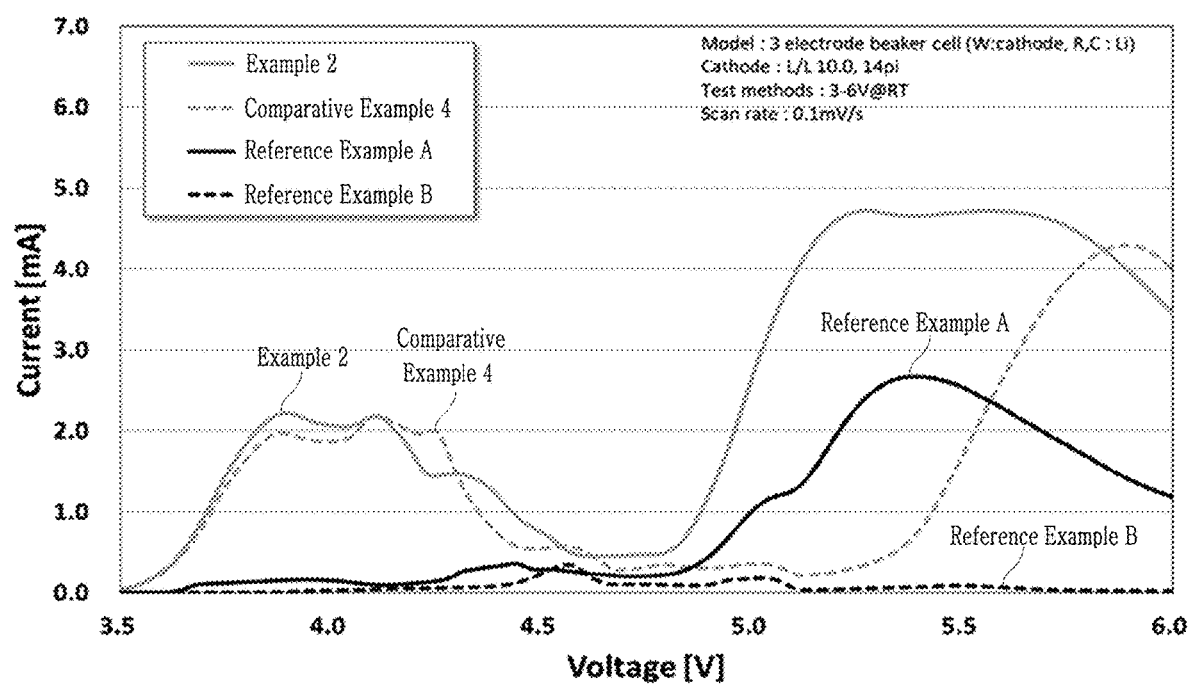
FIG. 13 is a graph evaluating changes in current according to the charging voltage for the battery cells of Example 2, Comparative Example 4, Reference Example A, and Reference Example B.

The cells of Example 2, Comparative Example 4, and Reference Examples A and B were measured with respect to a current by increasing a voltage from 3 V to 6 V at a constant rate of 0.1 mV/sec at 25° C., and the results are shown in FIG. 13.

Referring to FIG. 13, Comparative Example 4 including no vinylene carbonate exhibited that the current did not increase at an abnormal voltage of 4.7 V or higher but tended to increase only after 5.2 V. On the other hand, Example 2 exhibited a rapid current increase from about 4.7 V but maintained a constant current after 5.0 V.

In addition, Reference Example A exhibited a rapid current increase from about 4.7 V, but Reference Example B including no vinylene carbonate exhibited no current change to 6 V. Accordingly, the gas emission increase at 4.7 V or higher, as shown in FIG. 13, was confirmed as an action of the lithium borate of the positive electrode and the vinylene carbonate included in the electrolyte solution rather than that of the specific surface area.

While the subject matter of this disclosure has been described in connection with what is presently considered to be practical example embodiments, it is to be understood that the subject matter of the present disclosure is not limited to the disclosed embodiments. On the contrary, it is intended to cover various modifications and equivalent arrangements included within the spirit and scope of the appended claims, and equivalents thereof.

| Description of Symbols | |
| --- | --- |
| 11: secondary particle | 12: inner portion of secondary particle |
| 13: primary particle | 14: outer portion of secondary particle |
| 100: rechargeable lithium battery | 112: negative electrode |
| 113: separator | 114: positive electrode |
| 120: case | 140: sealing member |

What is claimed is:

1. A rechargeable lithium battery, comprising:
a positive electrode comprising a positive electrode active material comprising a secondary particle in which a plurality of primary particles are aggregated, the secondary particle having at least a portion of the primary particles radially arranged and comprising a lithium nickel-based composite oxide, and a boron coating layer on the surface of the secondary particle and comprising lithium borate;
a negative electrode;
a separator between the positive electrode and the negative electrode;
an electrolyte comprising vinylene carbonate; and
a case containing the positive electrode, the negative electrode, the separator, and the electrolyte; and
a boron doping layer located inside the primary particle exposed on the surface of the secondary particle.

2. The rechargeable lithium battery of claim 1, wherein:
in the rechargeable lithium battery, an amount of gas generated per weight of the positive electrode active material is greater than or equal to about 3.0 cc/g when overcharged at 5V.

3. The rechargeable lithium battery of claim 1, wherein:
the case is provided with an overcharge safety device.

4. The rechargeable lithium battery of claim 3, wherein:
the overcharge safety device is at least one selected from a device for inducing an open circuit when the internal pressure of the battery exceeds a set value, and a device for inducing a short circuit when the internal pressure of the battery exceeds a set value.

5. The rechargeable lithium battery of claim 3, wherein:
the overcharge safety device operates when the internal pressure of the rechargeable lithium battery is greater than or equal to about 7 kgf/cm².

6. The rechargeable lithium battery of claim 1, wherein:
the vinylene carbonate is included in the electrolyte in an amount of about 0.1 wt % to about 5 wt % based on the total weight of the electrolyte.

7. The rechargeable lithium battery of claim 1, wherein:
in the positive electrode active material, the lithium borate of the boron coating layer comprises $LiBO_2$, $Li_3B_7O_{12}$, $Li_6B_4O_9$, $Li_3B_{11}O_{18}$, $Li_2B_4O_7$, $Li_3BO_3$, $Li_8B_6O_{13}$, $Li_5B_3O_7$, $Li_4B_2O_5$, $Li_{10}B_4O_{11}$, $Li_8B_2O_7$, or a combination thereof.

8. The rechargeable lithium battery of claim 1, wherein:
a content of lithium borate of the boron coating layer is about 0.02 wt % to about 0.5 wt % based on the total weight of the positive electrode active material.

9. The rechargeable lithium battery of claim 1, wherein:
the boron doping layer is within a depth range of about 10 nm from the outer surface of the primary particles exposed to the surface of the secondary particle.

10. The rechargeable lithium battery of claim 1, wherein:
the positive electrode active material further comprises a grain boundary boron coating portion that is on the surface of the primary particles inside the secondary particle and comprises lithium borate.

11. The rechargeable lithium battery of claim 10, wherein:
a weight of the boron coating layer is greater than a weight of the grain boundary boron coating portion.

12. The rechargeable lithium battery of claim 10, wherein:
a weight of the boron coating layer is at least 4 times a weight of the grain boundary boron coating portion.

13. The rechargeable lithium battery of claim 10, wherein:
the boron coating layer is included in the secondary particle in an amount of about 70 wt % to about 98 wt %, and the grain boundary boron coating portion is included in the secondary particle in an amount of about 2 wt % to about 30 wt % based on the total amount of the boron coating layer and the grain boundary boron coating portion.

14. The rechargeable lithium battery of claim 10, wherein:
a content of the boron coating layer is about 0.02 wt % to about 0.5 wt %, and a content of the grain boundary boron coating portion is about 0.001 wt % to about 0.05 wt % based on the total weight of the positive electrode active material.

15. The rechargeable lithium battery of claim 1, wherein:
in the positive electrode active material, the primary particles have a plate shape, and at least a portion of the plate-shaped primary particles are radially arranged in the secondary particle.

16. The rechargeable lithium battery of claim 15, wherein:
an average long axis length of the plate-shaped primary particles is about 150 nm to about 500 nm, an average thickness is about 100 nm to about 200 nm, and a ratio of the average thickness to the average long axis length is about 1:2 to about 1:5.

17. The rechargeable lithium battery of claim 1, wherein:
in the positive electrode active material, the secondary particle comprises an inner portion and an outer portion surrounding the inner portion, the inner portion comprises an irregular porous structure, and the outer portion comprises the radially arranged primary particles.

18. The rechargeable lithium battery of claim 1, wherein:
in the positive electrode active material, the lithium nickel-based composite oxide is represented by the following Chemical Formula 1:

$$Li_{a1}Ni_{x1}M^1_{y1}M^2_{1-x1-y1}O_{2-z}X_z \qquad \text{Chemical Formula 1}$$

wherein, in Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ are each independently Al, B, Ba, Ca, Ce, Co, Cr, Cu, Fe, Mg, Mn, Mo, Nb, Si, Sr, Ti, V, W, Zr, or a combination thereof, and X is F, P, S, or a combination thereof.

* * * * *